United States Patent [19] [11] Patent Number: 4,672,529
Kupersmit [45] Date of Patent: Jun. 9, 1987

[54] SELF CONTAINED DATA ACQUISITION APPARATUS AND SYSTEM

[75] Inventor: Carlos A. Kupersmit, Lake Worth, Fla.

[73] Assignee: Autech Partners Ltd., Pompano Beach, Fla.

[21] Appl. No.: 665,166

[22] Filed: Oct. 26, 1984

[51] Int. Cl.⁴ ............................................. G06F 11/00
[52] U.S. Cl. ................................... 364/130; 364/551; 324/51; 324/73 AT
[58] Field of Search ............... 364/130, 184, 186, 187, 364/551; 324/51, 73 R, 73 AT

[56] References Cited

U.S. PATENT DOCUMENTS 4,488,299 12/1984 Fellhauer ........................ 324/73 AT
4,527,271 7/1985 Hallee ................................. 364/184

Primary Examiner—Jerry Smith
Assistant Examiner—Allen MacDonald
Attorney, Agent, or Firm—Mueller and Smith

[57] ABSTRACT

A self contained data acquisition and control system and apparatus with direct process input and output capability. Designed to operate within the harsh environment of a process zone, the apparatus employs a variety of process monitoring and control modules which perform under the direction of redundant computer controllers. These controllers provide control data loading to the modules as well as receive and transmit process status data. The modules are each formed having a hardware control and status monitoring circuit which performs in conjunction with a module microprocessor based control. One module provides for field contact actuation in combination with a technique for deriving data signals form the contact and associated field wiring for evaluating the performance of those same field contacts. Another module provides an isolated electronic switch output wherein the battery power supply or the like is provided with the control apparatus and the status of the load, the power supply and the switch itself is ascertained, while a third analog output module uniquely combines two analog outputs in redundancy an further exhibits status monitoring including full loop status monitoring from the point of derivation of the analog output at a digital analog to converter to the return current from the load itself.

38 Claims, 34 Drawing Figures

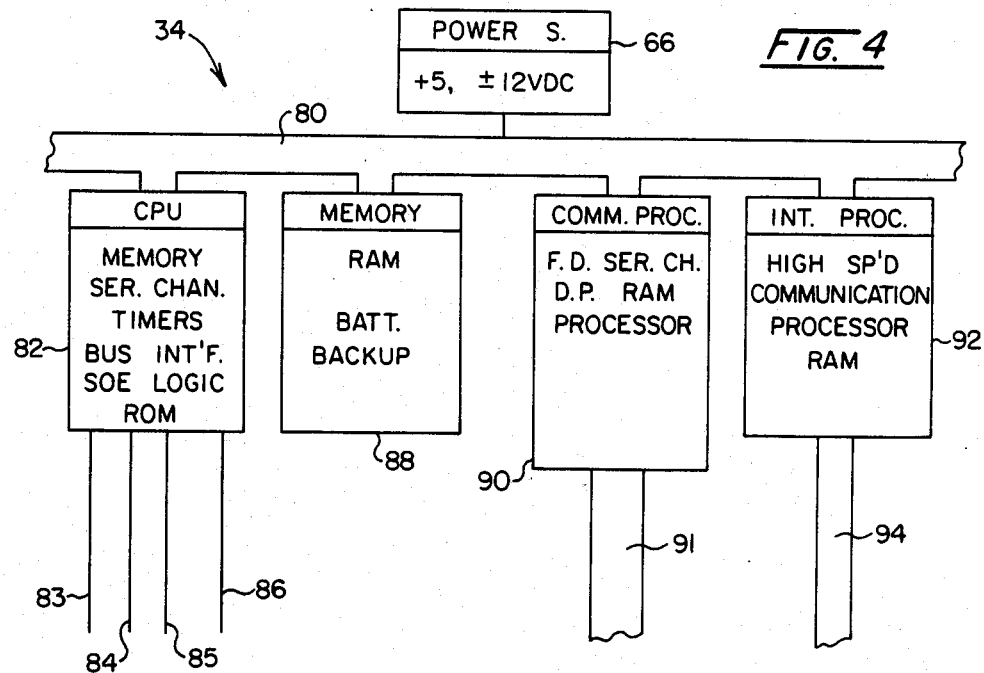
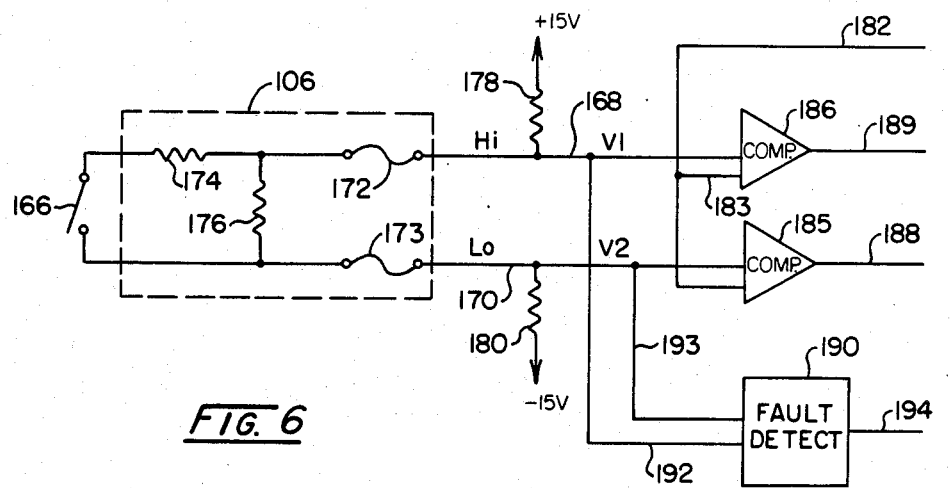

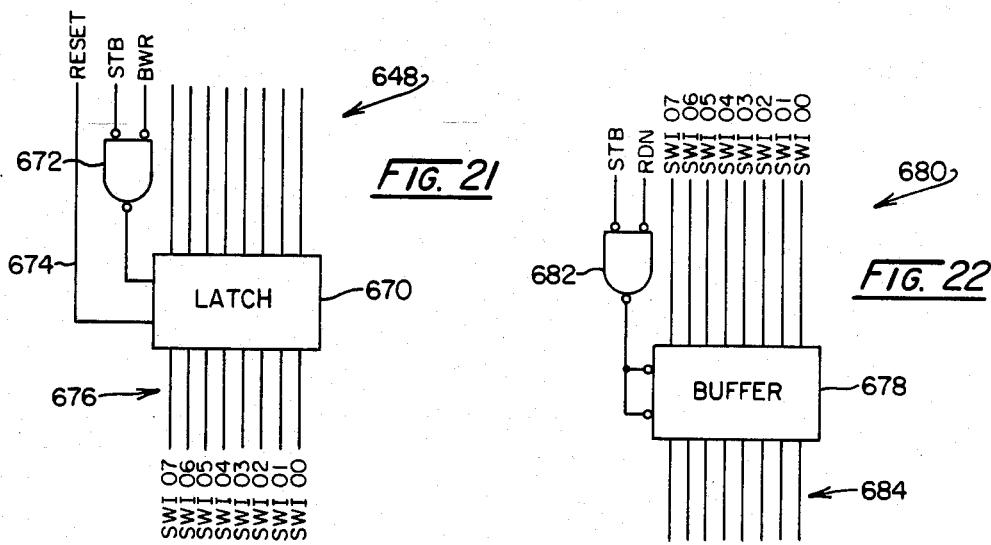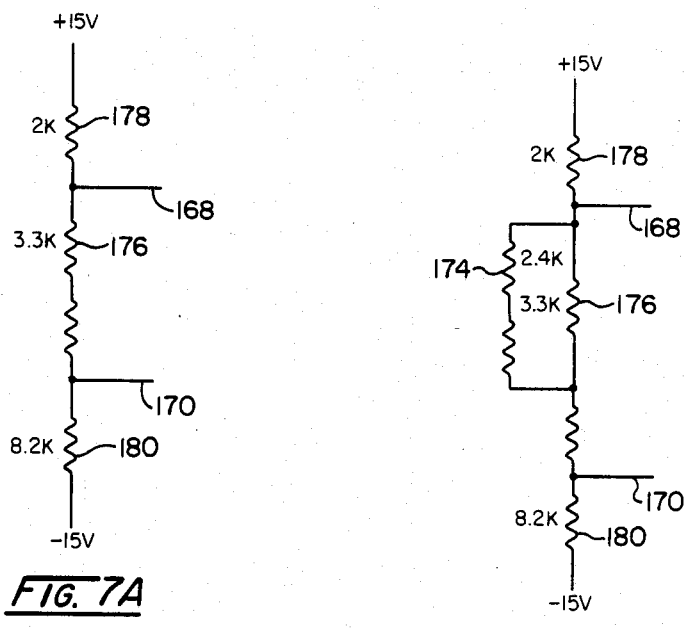

| THRESHOLD VALUES (V) | | -1.0 | -6.0 | -3.35 | -1.0 | 1.5 | 4.5 | 7.5 | 10.5 |
|---|---|---|---|---|---|---|---|---|---|
| CONDITION | OPEN WIRES | UND. FAULT | H⟶⊥ (shorted) | H⟶⊥ | L⟶⊥ | ⟶o⟶ | ⟶o-o⟶ | H⎯⊥⎯L | |
| NOMINAL VALUES(V) | | -8.0 | -4.4 | -2.3 | 0 | 3 | 6 | 9 | |
| THESH VALUES(HEX) | A8 | 02 | 3A | AE | 09 | 0D | 0B | 0F | |

*FIG. 9*

| THRESHOLD (V) | | 3.0 | | 7.8 | |
|---|---|---|---|---|---|
| CONDITION | H⎯⎯ L⎯⊥ | | L⟶o⟶⊥ | | L⟶o o⟶⊥ |
| NOMINAL (V) | 0.0 | | 6.25 | | 9.38 |
| THRESHOLD VALUES (HEX) | | 05 | | CB | |

*FIG. 10*

| CONDITION | | V1 VOLTS | V2 VOLTS |
|---|---|---|---|
| CONTACT 166 OPEN | ⟶o⟶o⟶ | 10.5 | 3 |
| CONTACT 166 CLOSED | ⟶o-o⟶ | 9.75 | 6 |
| CONTACT 166 OPEN, HI WIRE 168 SHORTED TO GROUND | ⟶o⟶o⟶  H⎯⊥ | 0 | -4.4 |
| CONTACT 166 CLOSED, HI WIRE 168 SHORTED TO GROUND | ⟶o-o⟶  H⎯⊥ | 0 | -2.3 |
| CONTACT 166 OPEN, LO WIRE 170 SHORTED TO GROUND | ⟶o⟶o⟶  L⎯⊥ | 9.38 | 0 |
| CONTACT 166 CLOSED, LO WIRE 170 SHORTED TO GROUND | ⟶o-o⟶  L⎯⊥ | 6.25 | 0 |
| FIELD WIRES 168, 170 SHORTED | H⎯⎯⊥⎯⎯L | 9.0 | 9.0 |
| FIELD WIRES 168, 170 OPEN | H⎯ ⎯ or L⎯ ⎯ | 15 | -15 |
| BOTH FIELD WIRES 168, 170 GROUNDED | H⎯⎯⊥⎯⎯L | 0 | 0 |

*FIG. 8*

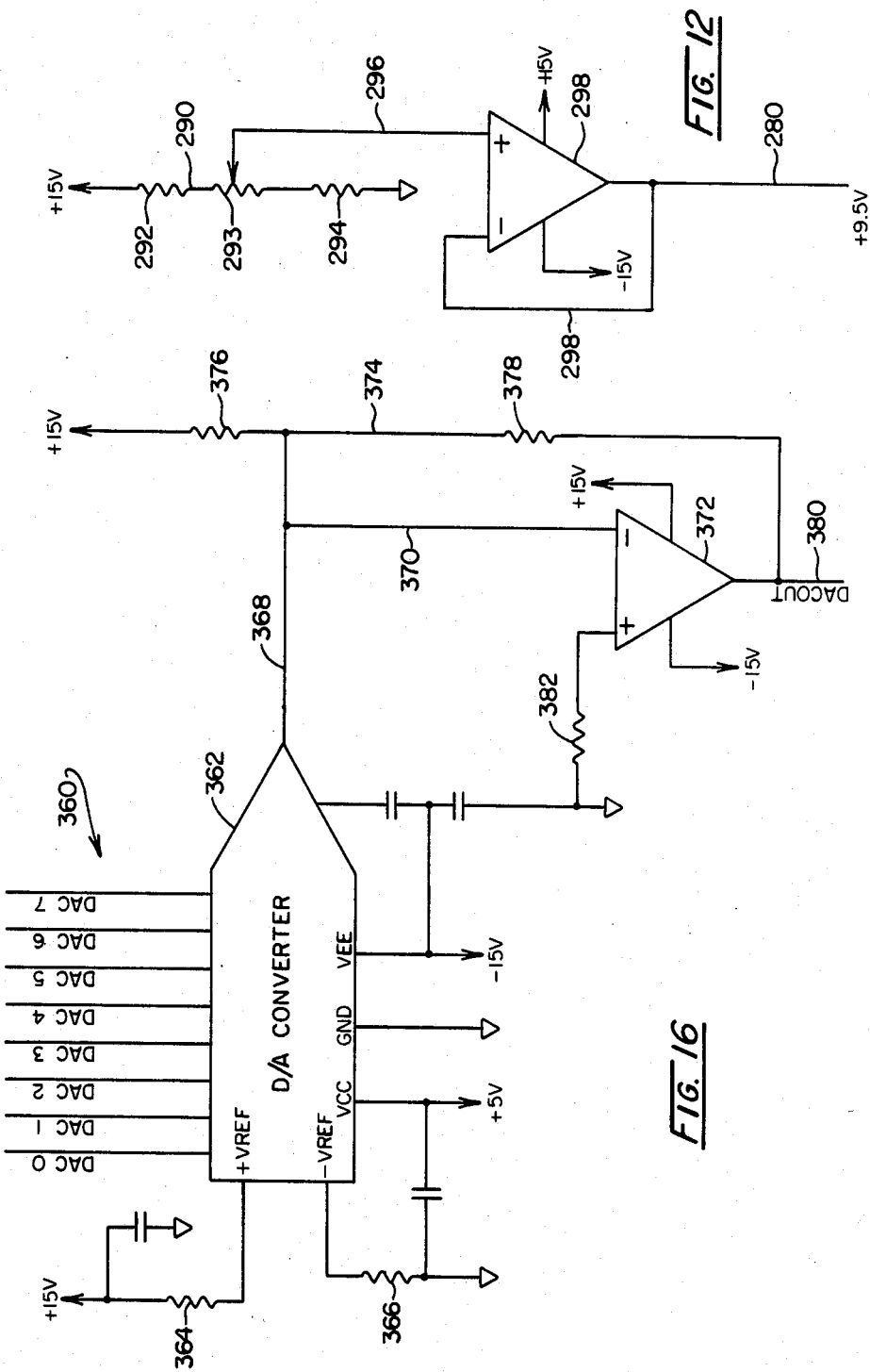

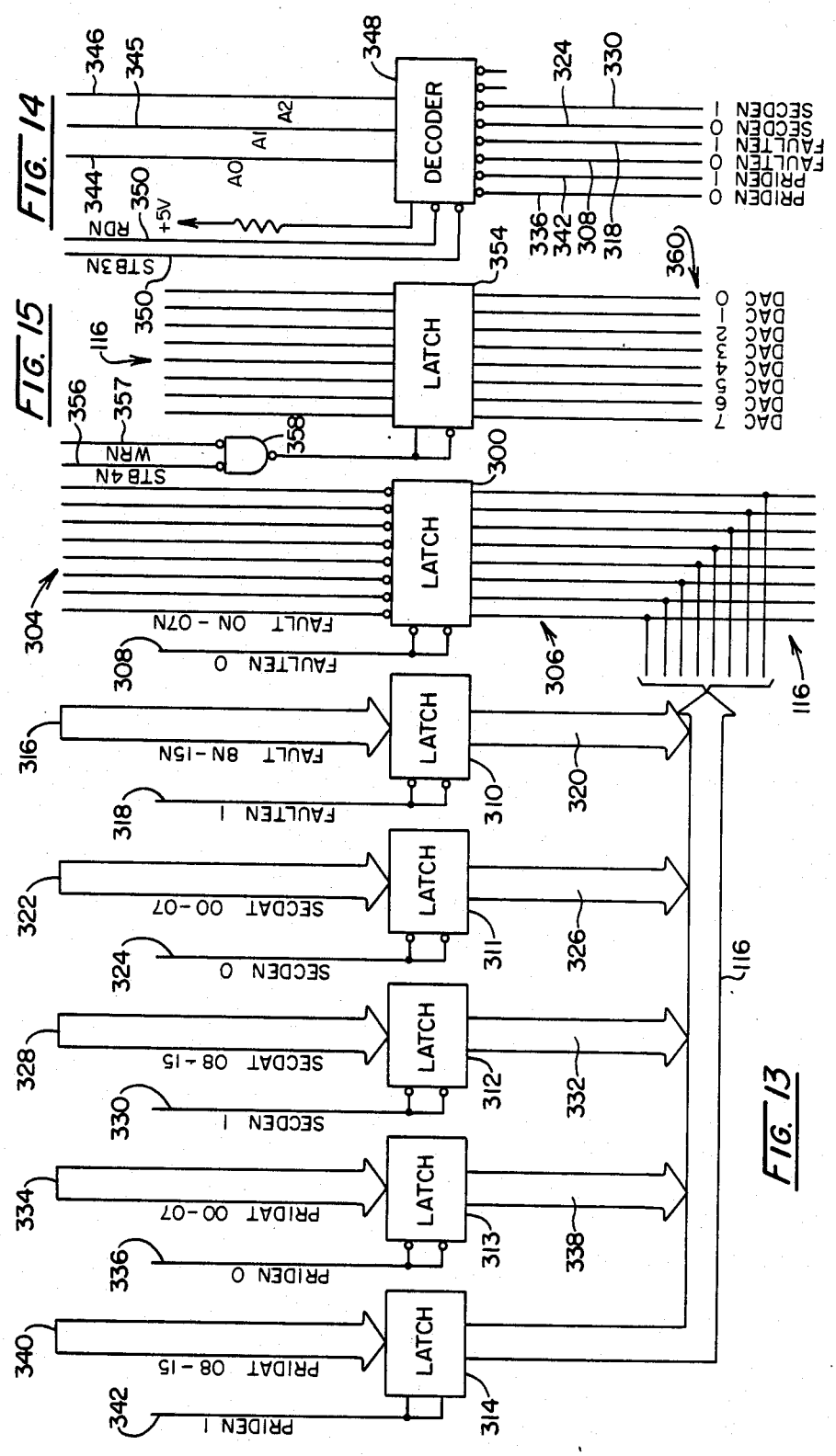

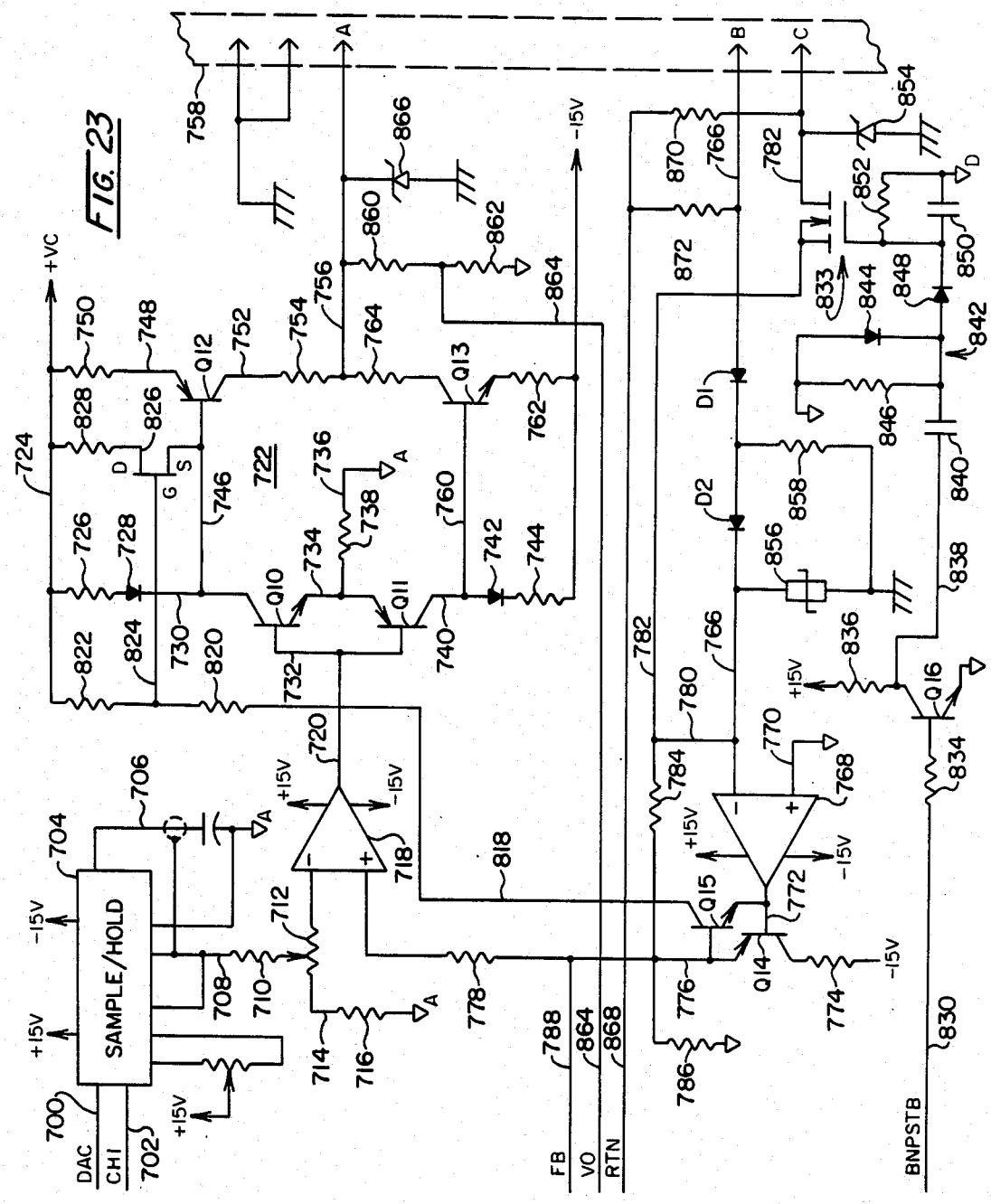

SELF CONTAINED DATA ACQUISITION APPARATUS AND SYSTEM

BACKGROUND

Industrial production processes and systems historically have been the subject of refinement and improvement, not only with respect to the development of new and improved products, but also with regard to process efficiency. With the advent of computerized control systems, process system throughput rates have been significantly enhanced and labor intensive procedures have been reduced. Of particular note, industrial procedures which necessarily have involved conditions uncomfortable or hazardous to production personnel, in many instances, have been automated to the extent that operators can remain in safe, environmentally controlled regions of a plant facility while still carrying out production functions. Of course, for certain industries, these desirably safe and reasonably comfortable remote control facilities have not been available due to the economic trade-offs involved or the inability of industrial design investigators to achieve adequate remote process control solutions.

The automation of an industrial process is seen to embrace two principal aspects, to wit, the measure of process parameters and the control thereof. Process measurement generally employs sensing devices, for example, thermal measurement component such as thermocouples or spectral devices, electrical and chemical analyzers and the like, while elements utilized in the control of process function additionally will include tractive electromagnetic mechanisms, switching systems, tracking and similar systems involving any of a broad range of electromechanical and solid-state components.

Where industrial process control and monitoring procedures are carried out in large production complexes from environmentally protected control centers, communication between process control and monitoring components and remote control centers is provided by field wiring. This wiring is compiled at one position or another in the vicinity of the production process into cabling which usually extends over considerable distances toward the central control station. Generally, one control or monitoring position or "point" involving, for instance, a switch or thermocouple, will require one pair of wires which extend to the input/output ports of a computer situated at the control center. Often encountered industrial facilities for which remote monitoring and process control are employed are power generating plants, chemical and metals processing plants and the like where, for example, 1,000 points may be controlled or monitored by wire pairs, thus requiring the extension of 2,000 lines to the central control facility. At that facility, these lines are directed through extensive connector cabinet installations and labyrinths of spreaders to extend finally to desired input/output ports, for example, of a computer control. Such facilities generally are of such a physical extent, that the cabling will be positioned over runs typically ranging from 5,000 meters to 10,000 meters. The cost of such installation for this centralized monitoring and control are quite apparent, power plants often providing capital expenditures of about 20 million dollars for cabling. Of course, the upgrading of processes is continually underway in modern industrial facilities and thus, it becomes necessary that such upgrading also contemplate the necessity of "pulling" cable to achieve the desired upgraded control between the production location and remote control center.

The installation of such numerous and lengthy cable communication links also necessarily involves the hazards of interference from plant activity, such as trucks and similar vehicles cause damage and resultant production difficulties.

While the foregoing elaborate monitoring and process control or industrial communications systems are operative, their long term effectiveness is encumbered both by the operational vagaries of the transducing devices they control or monitor, as well as by the unavoidable exposure of extensive cabling to the environment of the plant through which it extends. In consequence, statistically high numbers of process shutdowns or trip points are reached because of the nonreception of control signals by transducing devices or by the alteration of signal levels and the like which may be generated, for example, from thermocouples and the like. More effective remote operations can be achieved where an assurance that signals are received by transducing elements is provided as well as an assurance on the part of central control that switches are closed and switches as well as field wires are functioning. Further, many industrial facilities cannot cost justify remote monitoring and process control in view of the extensive capital expenditures involved as above discussed. For these industries, some form of process monitoring and control is required which is capable of operating within corrosive and prohibitive environments but yet can remain cost effective.

SUMMARY

The present invention is addressed to an industrial communications system and apparatus which substantially replaces remote, environmentally protected control rooms and associated communication cabling labyrinths with compact, on-site monitoring and process control devices capable of continuous and reliable operation under adverse industrial environmental conditions. Where remote system host computer monitoring is maintained for production, the system of the invention locally converts all analog values and the like into digital information which then may be transmitted in serial data format to any desired remote location. In consequence, high speed communication links may be employed, for example, utilizing redundant fiber optic cable linkage which are capable of serially transmitting at such high speeds, for example, in the 10 megabit range, as to effect the replacement of the above-discussed extensive labyrinth of cabling with but a single optic transmission cable pair. Of particular interest, this optical master linkage provides reliable performance without interference from electrical phenomena or the like which otherwise might interfere with conventional cabling.

The system and apparatus of the invention further provides a greatly enhanced quality of control, deemed "fault proofing" wherein monitored or control data received or transmitted are evaluated on site by unique electronic hardware as well as through associated software features. For example, verification is achieved that data are received at the process under control itself and that data which are derived from the process are valid data. For example, the state of process switch contacts are monitored utilizing unique features of the invention.

Status conditions wherein a wire that is broken are discernable from a contact that is open and a shorted wire is discernable as opposed to a valid contact at a switching location. Where an electronic switch receives a close command or transmits a closed condition, a determination is available as to whether that condition of the switch indeed exists.

Through the utilization of token transfer protocols, process shut-down due to data collection or control failure is substantially minimized.

Another feature and object of the invention is to provide an isolated electronic switch output module which performs at the control unit of the invention and which is coupled with a remote actuator requiring switching performance. By coupling the battery or like power supply source at the control unit, a capability for monitoring the presence of power and current leading to the load is achieved. This same flexibility permits a broad aspect of verification of the status of the switch within the control unit, the field wiring leading to the load and the status of the load itself. This information or data are assembled at the control unit for use in a broad range of process evaluations desired by the operator.

As another object of the invention, analog output drive circuits are provided wherein analog values for current being addressed to a load are readily derived and checked through a broad range of unique status evaluations. Of particular importance, redundant analog output drive circuits are provided which operate in concert such that on the failure of one and the switch over to another, current levels are properly maintained without loss of control intelligence. The status checking permitted by this uniquely-redundant output drive circuit involves such parameters as knowing the voltage across the given load and full loop checks which commence with the evaluation of digital outputs to redundant converters deriving analog values for current generation.

Another feature and object of the invention is to provide, for utilization in an industrial system wherein a process is carried out within a production environmental zone with the utilization of switching monitors and load energizing devices such as actuators coupled by a multiplicity of field wires to a control station, an improved monitoring and control system which includes an environmentally secure housing positionable within the zone. The system further includes a switching input process interface which is substantially positioned within the housing and which include a switch interface connectable by field wiring with the switching monitors for deriving data signals and for evaluating the performance of the switching monitors and associated field wiring to derive switching input status symbols representing those data signals and performance. The system further includes a switching input process control for controlling the switch interface with respect to each of the select switching monitors and for receiving status signals. A controller is positioned within the housing and includes a communications processor in interactive data transfer communication with the switching input process control as well as a controller memory and controller central processing equipment for evaluating the switching input status signals received by the communications processor and deriving process data output signals corresponding therewith. The controller further selectively controls the switching input process control.

Another object of the invention is to provide a system for monitoring the status of field contacts and the field wires which are operationally associated therewith which includes a contact monitoring arrangement including terminals connectable with first and second of those field wires extending to the field contacts. An arrangement for applying a predetermined potential of first polarity to the first field wire and a predetermined potential of second polarity to the second wire further is provided along with a biased response device coupled with the two field wires and the field contacts in the vicinity of those contacts and for deriving a first analog voltage signal corresponding with the first field wire and a second analog voltage signal corresponding with the second field wire. A comparator is provided which is responsive to the first and second analog voltage signals and to predetermined threshold signals for deriving contact input status signals. A threshold arrangement of the system is actuable for generating the predetermined threshold signals and a contact input process control provides for selectively actuating the threshold arrangement and receiving the contact input status signals.

Another object of the invention is to provide an improved monitoring and control system as above described wherein the aforesaid environmentally secure housing is provided which is positionable within the noted production environmental zone. A switch output process interface is positioned within the housing which includes a terminal arrangement connectable with first and second polar designated sides of a source of power and is further connectable by field wiring to selected first and second positions across the load at such actuators as are utilized in conjunction with energizable loads. A solid-state switch is arranged having a switching input connectable by the terminals with the load first position and a switching output connectable by the terminals with the source first side, the switch being actuable into conduction upon the assertion of a select bias signal thereto. A first isolation device is responsive to a command input signal for effecting the assertion of the select bias signal through dielectrically isolated signal transmission components. Further, a current detect network is provided which is connectable by the terminals intermediate one load position and a correspondingly couple polar designated source which has a load current output signal in the presence of a select value of current detected thereacross. A second isolation device is incorporated which is responsive to the load current output signal for providing through dielectrically isolated transmission components a load current status output. A switch output process control for controlling the switch output process interface is arranged to provide that control by assertion of the command input signal and is responsive to the load current status output to effect an evaluation thereof with respect to the command input signal and provides switch output status signals. Further, a controller is provided which is positioned within the noted housing and which includes the above-described controller components.

Another object of the invention is to provide a switch output circuit for connection with loads which comprises the switch output process interface components as described above along with the noted switch output process control features.

Another object of the invention is to provide an improved monitoring and control system utilized in an industrial environment wherein a process is carried out within a production environmental zone with the utilization of actuators with energizable loads coupled by a multiplicity of field wires to a control station. The system includes an environmentally secure housing which is positionable within the production environmental zone along with an output drive interface positioned within the housing which includes a control input responsive to a control signal input for deriving an analog signal of predetermined value corresponding therewith. An error stage is provided which is responsive to the analog signal and a feedback signal to provide a control output corresponding with the difference of value and polarity thereof. Terminals are connectable by the field wires with the aforesaid load and a current output arrangement is responsive to the control output for applying current corresponding therewith from the terminals to the load. A ground stage has an input coupled with the terminal for receiving feedback current through a field wire from the load and which derives the feedback signal as a voltage value in inverted correspondence with the feedback current. To provide redundant operation, two of the aforesaid output drive interface arrangements are provided, the first or primary one of which includes a select impedance coupled with the ground stage and intercepting the feedback current. The interface devices are coupled in common to the load through the field wire and the feedback input of the first is additionally coupled to a switched feedback input to the ground stage of the back-up interface device. An output drive process control controls the primary and back-up output drive interface devices and selectively actuates that switching arrangement. Additionally, a controller as above described is provided which includes a communications processor in interactive data transfer communication with the output drive process control and the central processing unit of the controller derives process data output signals and selectively controls the output drive process controls.

Another object of the invention is to provide an analog output circuit for connection with actuator derived loads which includes an output drive circuit having a control input responsive to a control signal input for deriving an analog signal of predetermined value corresponding therewith. An error stage is responsive to the noted analog signal and to a feedback signal to provide a control output corresponding with the difference of value and polarity thereof. A current output arrangement is responsive to the control output for outputting current corresponding therewith at an output thereof to the load. A ground stage amplifier is configured to provide a virtual ground and has an input for receiving feedback current from the load and deriving the feedback signal as a voltage value in inverted correspondence with the feedback current. An output impedance is responsive to the current output arrangement output for deriving a voltage out signal corresponding with the outputted current and a return impedance is provided which is responsive to the feedback current from the load for deriving a return signal as a voltage level corresponding with the value of the feedback current. Additionally, a comparison circuit is provided which is responsive to the voltage out signal and the return signal for deriving an effective voltage signal representing the difference therebetween and is responsive to the control input analog signal and the effective voltage signal for effecting a comparison of the values thereof to derive load status signal.

Another object of the invention is to provide a switch output circuit for connection with loads which comprises a switch output arrangement including terminals connected with the first and second polar designated sides of a source of power by field wiring to first and second positions across the noted load. A solid-state switch having a switching input connectable by the terminal with the load first position and a switching output connectable by the terminal with the source first side is provided which is actuable into conduction upon the assertion thereto of a select bias signal. A first isolation device is responsive to a command input signal for effecting the assertion of the select bias signal through dielectrically isolated signal transmission components and a current detect network is provided which is connectable by the terminal intermediate one load position and a correspondingly coupled polar designated source and which has a load current output signal in the presence of a select value of current detected thereacross. A second isolation device is responsive to the load current output signal for providing a load current status output and a switch output process control arrangement is incorporated for controlling the switch output process interface by assertion of the command input signal and is responsible to the load current status output to effect an evaluation thereof with respect to the command input signal.

Other objects of the invention will, in part, be obvious and will, in part, appear hereinafter. The invention, accordingly, comprises the system and apparatus possessing the construction, combination of elements and arrangement of parts which are exemplified in the following disclosure.

For a fuller understanding of the nature and objects of the invention, reference should be had to the following detailed description taken in conjunction with the accompanying drawings.

BRIEF DESCRIPTION OF THE DRAWINGS

FIG. 4 is a schematic representation of the controller component described in connection with FIG. 3;

FIG. 6 is a schematic representation of components shown in FIG. 5 but at a higher level of detail;

FIGS. 7A and 7B are equivalent circuit diagrams for use in conjunction with the description of FIG. 6;

FIG. 8 is a table relating voltage output values with switch and ground conditions;

FIG. 9 is a table relating threshold values with switch status conditions;

FIG. 10 is a table relating threshold values with switch and line conditions;

FIG. 12 is an electrical schematic diagram of a voltage generation network;

FIG. 13 is an electrical schematic diagram showing the latching of status data to a bus;

FIG. 14 is an electrical schematic diagram showing an address decoding circuit;

FIG. 15 is an electrical schematic diagram showing a latch arrangement;

FIG. 16 is an electrical schematic diagram showing the implementation of a digital-to-analog converter;

FIG. 21 is an electrical schematic diagram showing a latch arrangement;

FIG. 22 is an electrical schematic diagram showing a bus driver or buffer arrangement;

FIG. 23 is an electrical schematic diagram of an output drive circuit according to the invention;

DETAILED DESCRIPTION

The industrial control system of the invention utilizes a secure control unit which is positioned in the relatively near vicinity of a production process, i.e. in its environmental zone. This unit, containing a significant amount of process control (load-containing actuators) and monitoring circuitry, is structured so as to protect such important equipment form the harsh environments typically encountered in the industrial area. Field wiring from monitors and actuators employed with the given production process and which may be significant and extensive in number, is coupled to protected terminal blocks within the on-site unit and thus, advantageously may be of significantly shorter length, more easily protected and more readily installed.

All process control and monitoring may be carried out from this on-site control unit itself. However, interactive communication is available by, for example, high speed fiber optic transmission to host computers and related equipment located an extensive distance away or within a protected remote off-site control room. This rapid transmission becomes available because all analog forms of data which may be evolved in the control process are converted to digital format which then may be transmitted in serial data fashion at highly rapid baud rates to the remote control room. Additionally, one control unit may be coupled in interactive communication with any of a series of other control units to provide a network control of a broadly ranging industrial system. Advantageously, the fiber optic transmission systems are relatively small in extent preferably employing redundant transmission lines which are readily protected from the activity of the production environment such as vehicular operation and which inherently are immune from spurious phenomena which otherwise affects electrically conductive materials used in cabling or field wiring.

Communication either by networking from control unit to control unit or from any given control unit to a remote host facility is carried out using a "token passing" protocol as described in IEEE Standard 802.4. Selection of this protocol permits a significant enhancement of reliability of the control system.

Figure 1:
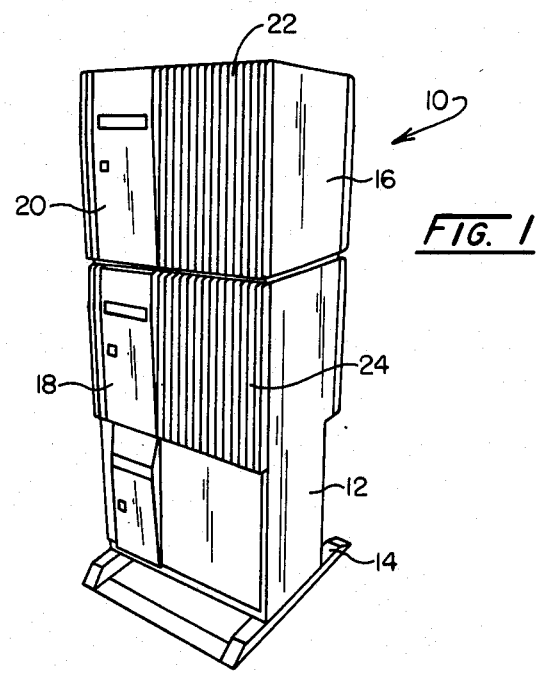
FIG. 1 is a pictoral representation of the monitoring and control apparatus of the invention.

Looking to FIG. 1, the control unit is revealed generally at 10 having a lower upstanding housing portion 12 supported from a base 14 and which, in turn, supports an upper housing 16. Each of the housing portions 12 and 16 are hermetically secure and are accessed from doors, for example, shown respectively at 18 and 20 which provide an environmentally secure enclosure and which incorporate such features, for example, as automatic closure and latching. The latter feature accommodates for the human factors associated with industrial workers in the field forgetting to close doors. Field wiring extending from monitors and actuators is attached at the lower housing 12 through the utilization of protected terminal blocks and the noted communications links with remote regions or other control units 10 also are provided at that lower region. The control unit 10, being exposed to the natural air convection currents of the process environmental zone, incorporates fins or the like along its exterior surfaces as shown at 22 and 24 as well as on the opposite side of the device to dissipate the heat generated by the electronics therewithin.

Figure 2:
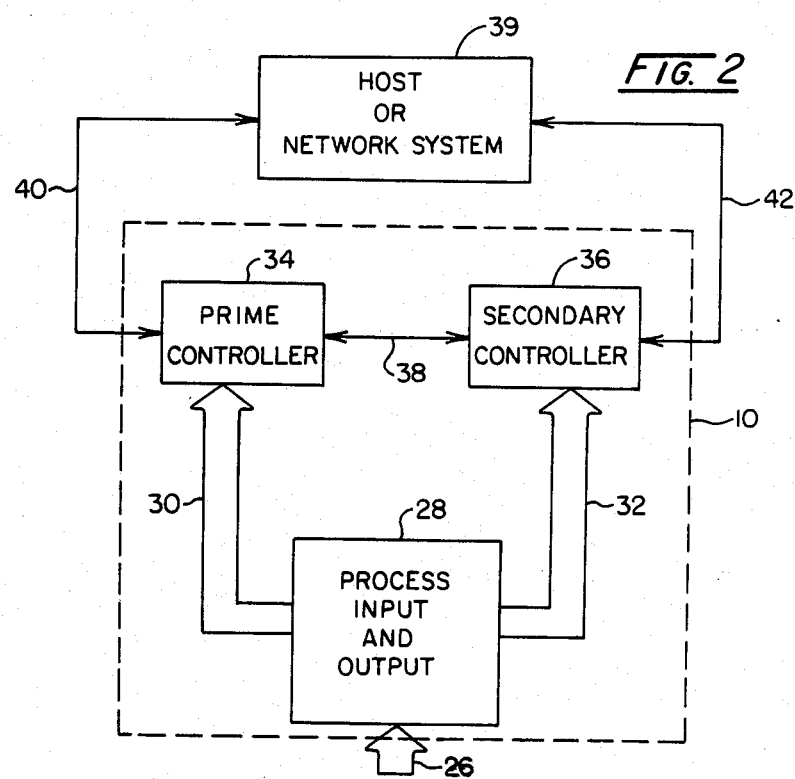
FIG. 2 is a schematic representation of the basic components of the controller of FIG. 1 showing its association with host or network systems.

Referring to FIG. 2, a broad, generalized representation of the system of the invention is revealed. Here, the field wiring is represented by arrow 26 which is introduced to the process input and output modules (PIO) represented by block 28. This PIO function is fully contained within the environmentally secure housing lower portion 12 of the unit 10 and the modules thereof can be selected at the desire of the user for purposes of carrying out control and/or monitoring of a variety of different process functions. In this regard, each module will be seen to contain a process interface function which is capable of monitoring or controlling along a plurality of discrete channels, for example 16. The hardware components of the process interface devices can carry out such functions as verifying the validity of the data received and providing status outputs representing not only a process condition, but the condition of the control to the process. This status checking holds both in conjunction with monitoring and control functions. In the latter regard, where analog signal outputs are directed from the process input and output function 28 to field controls, a highly desirable dual or redundant control output, wherein two outputs are tied operationally together has been developed for use with the system. Each of the process interface functions is, in turn, controlled by a microprocessor based control which carries the intelligence necessary to drive the interface function and which then has the capability of functioning in an interactive communications mode with higher levels of control. This interaction is by digital (generally serial) communication represented by the exemplary lead arrays 30 and 32 which are seen to extend to a prime controller 34 as well as simultaneously to a back-up controller 36. Controllers 34 and 36 preferably are located in the separate controlled environment of the upper housing portion 16 of unit 10. These controllers 34 and 36 are substantially identical except that controller 34 has the primary responsibility for the system while controller 36 serves a back-up function to controller 34. As an advantage, controller 36 also can be specially programmed to carry out test control functions while prime controller 34 operates in conventional mode. Note that the interrelationship of the controllers 34 and 36 is represented by line 38. In addition to receiving the data from the process input and output function 28, the controller 34 as well as back-up controller 36 serve to provide control inputs where so programmed by the user to the process input and output function 28 and to carry out interactive communications with, for example, a remotely located host computer or for interactive dialogue through a networking system of control units 10. As indicated earlier herein, this communication, for example with the host computer 39, may be by high speed fiber optic serial transmission and the communication from controllers 34 and 36 is represented by respective lines 40 and 42.

Figure 3:
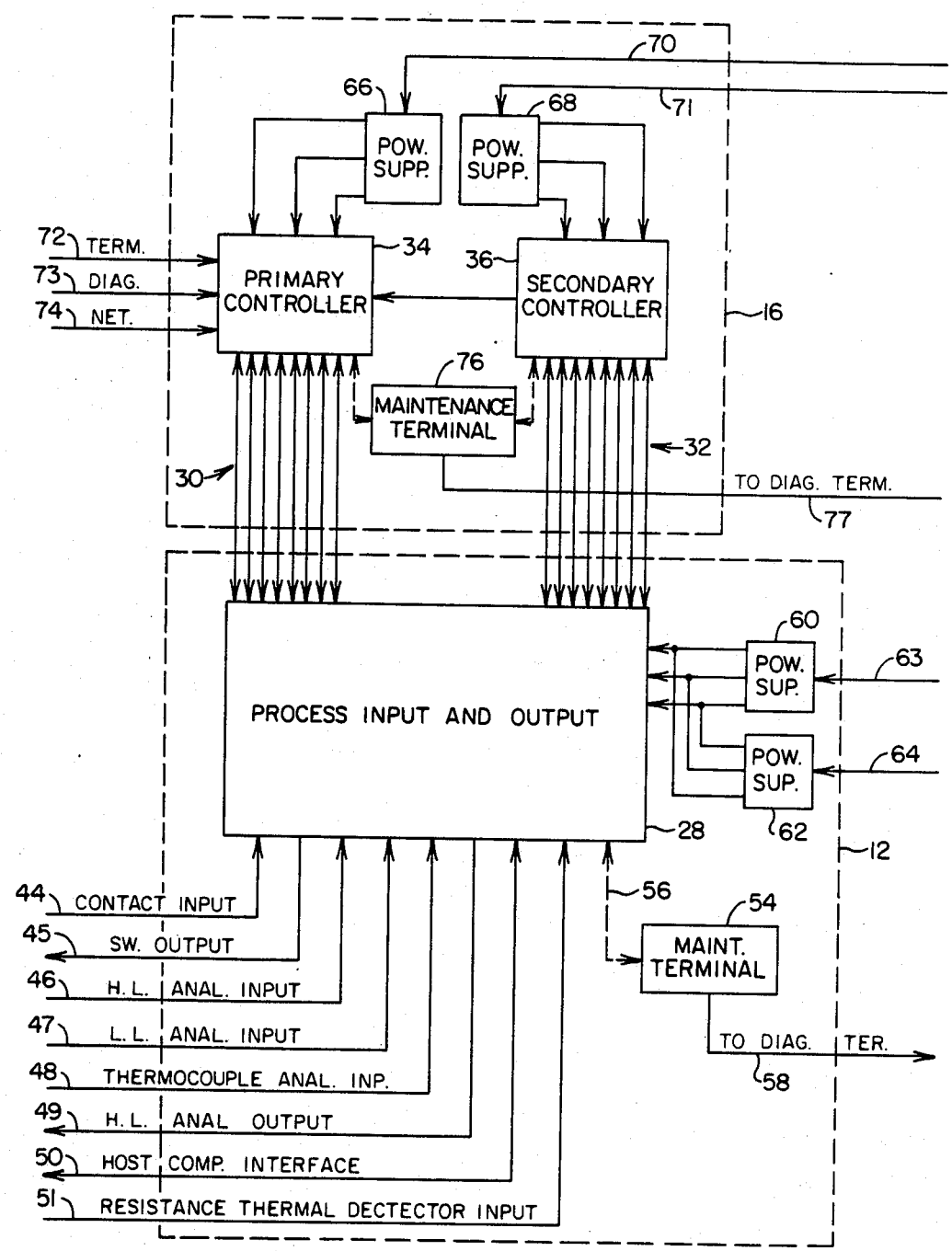
FIG. 3 is a schematic block representation of the monitoring and control apparatus of FIG. 1 showing components thereof at a higher level of detail.

Referring to FIG. 3, a next level of elaboration of the process control and monitoring functions of unit 10 is revealed. Looking to the figure, the process input and output function again is represented at block 28 having a series of line inputs extending thereto which represent the field line connections extending to the multiple channel inputs of individual control or monitoring modules within the function 28. Certain ones of these inputs or outputs having highly unique aspects are described in detail later herein. These aspects include the verification, for example, of switch conditions and development of information which describes the stage of any given communication with a process actuator or the like and the earlier-noted redundancy of signal output for analog control. Additionally, such features as surge protection to 3,500 volts as set forth in IEEE Standard 472, autocalibration for drift effects and the like and the isolation of control features from field inputs are provided. The various types of inputs or outputs to the process input and output function 28 are delineated in FIG. 3, for example, the input at line 44 being a contact input, for example through field wires from a switch. On the other hand, as represented at line 45, the function 28 provides a switch output which incorporates a form of load status monitoring. Lines 46 and 47, respectively, provide for the inputting of high level and low level analog inputs from field connections, while line 48 shows the inputting of thermocouple analog inputs. The microprocessor controls for the thermocouple module of the function 28 carry out necessary linearization procedures for this function at the location of unit 10 as well as the digitization of the output signal thereof. Line 49 shows a high level analog output feature, while line 50 shows a serial communication port to the host computer interface. Line 51 provides for the inputting of resistance thermal detector information. For all of these inputs and outputs, the process microprocessor functions of individual modules carry out preprocessing at the situs of unit 10.

Each of the modules within the process input and output function 28 also may be accessed by a maintenance terminal represented at block 54 and line 56. This terminal will give an illuminated readout to show maintenance requirements. As represented by line 58, the terminal also may be used in conjunction with a diagnostic terminal to carry out maintenance. The process input and output function is powered redundantly from two power supplies 60 and 62 which generally develop d.c. levels from a.c. or d.c. inputs as may be derived from respective lines 63 and 64.

As indicated earlier herein, the interface microprocessor functions of the modules of input and output function 28 communicate with the primary and secondary controller simultaneously, as now represented by bus multi-lead line arrays 30 and 32. Note that the primary and secondary controllers each have individual power supplies as shown, respectively, at 66 and 68. Developing d.c. levels, these power supplies 66 and 68 may derive their source input either from a.c. lines or from d.c. lines as represented at respective lines 70 and 71. The primary controller 34 may be associated with other devices in a number of different functions, for example, as represented at line 72, the association may be with an ASCII terminal for immediate operator usage or graphic output or the like. Similarly, as represented at line 73, the controller 34 may be operated in conjunction with an ASCII diagnostic terminal and, as represented at line 74, may be coupled with other control units 10 in a networking control over very large industrial processes. In the latter regard, the control units at 10 may operate in a stand-alone fashion by initial design, and are operable in that stand-alone posture even though any remote host computer with which interactive communication takes place should crash. In effect, these remote host computers serve only a supervisory function over the units as at 10. Finally, a single maintenance terminal as represented at block 76 provides an operational status output for the operator. As with the maintenance terminal 54, terminal 76 may be coupled as represented by line 77 to a diagnostic terminal for more involved maintenance purposes.

Referring to FIG. 4, a more elaborate representation of primary controller 34 is provided. The power supply again is represented at block 66 and is shown positioned above a backplane bus form of communication as represented at 80. This common bus communication is shown operationally associated with a central processing unit represented at block 82 which contains bus interface logic, memory which is expandable, serial channel communication, timers and a sequence of events (SOE) logic which is utilized particularly in conjunction with the networking of control units 10 for a given process control. The SOE logic periodically resets all of the clocks of the controllers 34 and 36 of the control units 10 such that the timing of all events is synchronized. Such feature is particularly desirable for determining in what order failures may occur in major process systems, situations commonly occurring in very large power plants powered, for example, by nuclear energy. Lines 83–86 extending from block 82 show the communication between the central processing unit 82 and, for example, the host computer, and a back-up CPU a maintenance terminal or other devices.

The memory function for controller 34 is represented at block 88 and includes the usually encountered random access memory (RAM) and read only memory (ROM) along with a battery back-up to assure that data is not lost in case of power failure. A communications processor function also is provided as represented at block 90 which is shown being connected to a bus 91. The latter bus is equivalent to the earlier described bus array 30 in FIG. 3. The communications processor provides eight full duplex, serial channels with 500K baud transmission rates, dual port RAM, and processing capability for achieving communication with the individual process microprocessors within function 28 (FIG. 3). The processor 90 serves as a data concentrator for data emanating from the latter process processors and provides for off-loading to the central processing unit 82. Finally, as represented at block 92, an interactive processor is provided for communication at high speeds, for example at 10 megaband rates with any remote host computer or the like. Generally, the processor 92 will perform in conjunction with a tranceiver providing for interactive communication along a fiber optic linkage or the like. The latter fiber optic linkage is utilized in longer linkages, for example exceeding about 5,000 meters.

Now considering the individual modular components of the process interface portion of control unit 10, particularly as listed in conjunction with lines 44-51, it may be observed that each such PIO module or device is comprised of dual circuits, one being a hardware oriented interface circuit and the other being a conventional microprocessor control for the interface board. The microprocessor control is of cnventional design, including the typically employed central processing unit or microprocessor, read only memory (ROM), random access memory (RAM), and interface (I/O) components both for parallel and serial data transmission and reception. Such process control functions are shown in block diagrammatic form in connection with the initial one of the process interface modules to be discussed but are assumed to be present in the remaining two such modules which are elaborated upon herein. A salient feature of certain of these modules as are herein discussed resides in the employment of interface hardware architecture which derives information as to the status of the control or monitoring feature. This status information then is made available to the primary and secondary controllers 34 and 36 to give highly useful and valuable information to production supervisory personnel.

CONTACT INPUT PROCESS INTERFACE

One module of the process input and output function 28 serves to monitor the condition of a contact within an industrial process. Such contacts, for example, usually are in the form of the contacts of a switch, either actuated by process machinery itself or, for example, through the actuation of a switch by an operator within the process zone. The contact or switching input process interface module of the instant invention serves to determine what the condition of the contacts of the switch are even though a variety of faults may occur. This is carried out utilizing only two field wire connections to the terminal interface associated with this module. Concerning the conditions or the various statuses of process actuators such as contacts and the two field wires leading to them, it may be observed that a field wire that has become open circuited looks to an ordinary contact sense circuit as an open contact. Similarly, two shorted field wires will exhibit the same condition to a typical interface receiving circuit as a closed contact. Also, it may be observed that switching contacts will, over a period of use, develop increasing contact resistances due to corrosion with resultant oxide build-up and the like at their points of contact. Most circuits responsive to contact closures will tolerate up to about 100 ohms of contact resistance whereupon they will assume a switch to be open. What is needed is a much higher tolerance to such contact resistance, for example, in the range of 1,000 ohms. Another phenomenon encountered in the field in conjunction with field wiring to process controlling or monitoring contact devices involves the ground faulting of one or both of the field wires. With the interface module of the instant invention, all of the above states or statuses can be detected and determined and additionally data as to switch closure or non-closure can be read.

Figure 5:
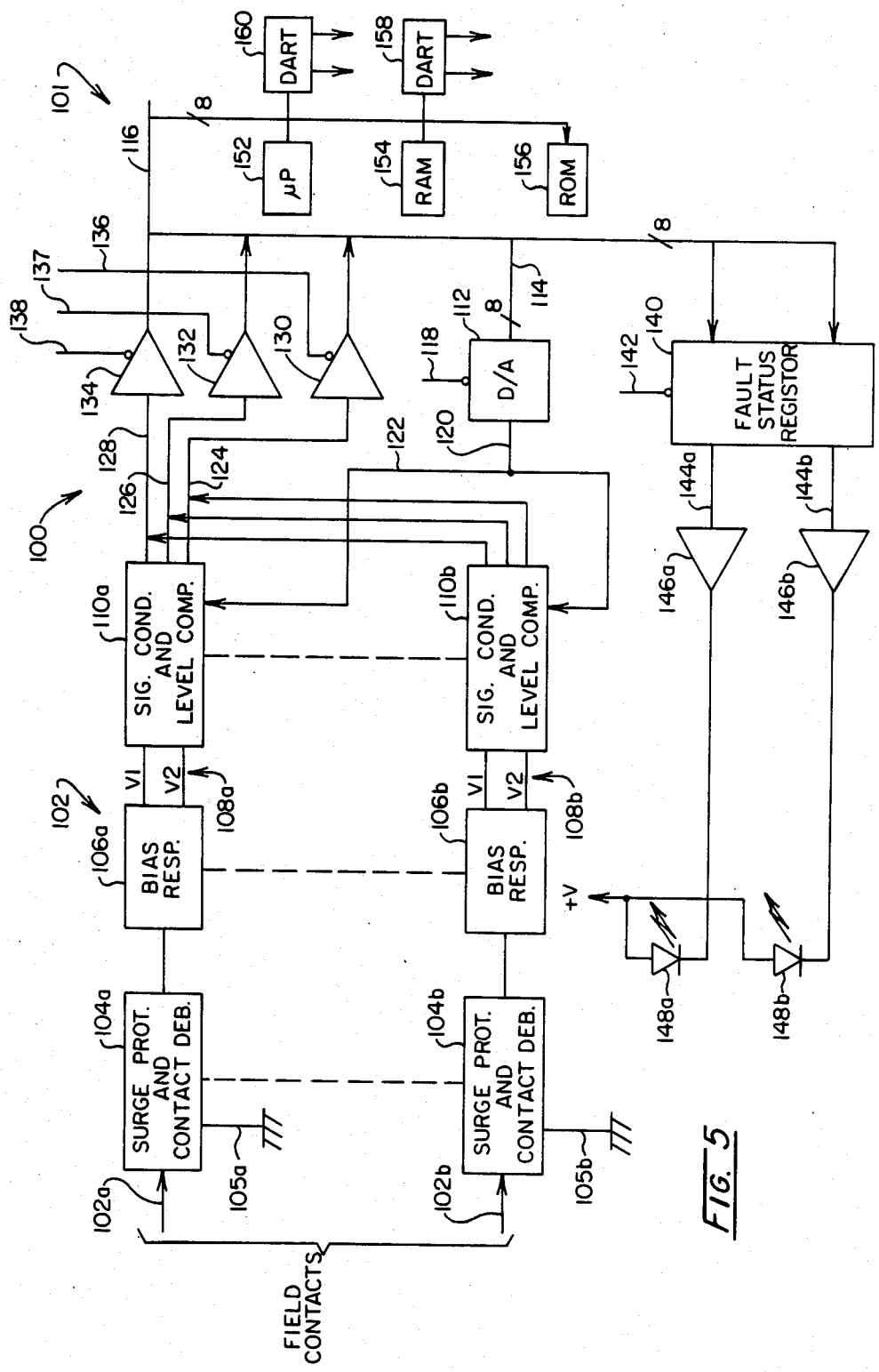
FIG. 5 is a block diagrammatic representation of a contact input process interface including a contact input process control.

Referring to FIG. 5, an overall schematic block diagram of the contact input process module or interface is shown generally at 100. Interface 100 is comprised, as above discussed, of two general sections, a contact or switch interface circuit represented at 102 and a microprocessor based switching or contact input process control as represented generally at 101. Looking to the former, each of the modules will contain a plurality of terminal inputs for a plurality of channels, for example 16. Two such channels are represented in FIG. 5 as having field contact inputs represented at arrows 102a and 102b. The treatment functions which are carried out with respect to such field contact inputs at 102a and 102b include a surge protection and contact debounce function as represented by blocks 104a and 104b. Additionally, a bias response network is provided as represented at blocks 106a and 106b. The bias response blocks function to provide a voltage output condition which is utilized then to derive the status of the field wiring and contacts themselves. Generally the bias response function as at 106a, 106b is coupled intermediate the contacts themselves and the field wiring and is associated with each of the two wires which lead from the contact input process interface terminal block and the field contacts themselves. The output of the bias response is provided as two voltage levels labelled V1 and V2 which are presented at line pair 108a from response network 106a and at line pair 108b from response network 106b. These voltage levels can be analyzed to determine contact status by a signal conditioning and level comparator circuit represented, respectively, at blocks 110a and 110b. Level comparison operations are carried out by the circuits at 110a and 110b in conjunction with references voltages which are developed by a singular digital-to-analog converter function represented at 112 which is controlled from an eight line bus 114 forming a part of the general busway 116 of the microprocessor based control 101. Analog outputs which are distributed from the analog converter function under control 101 regulation as represented at line 118 are presented as at lines 120 and 122 to the level comparison networks of the circuits 110a and 110b. The resultant outputs of the signal conditioners and level comparators as at 110a and 110b are three in number and are designated as primary data voltages corresponding with the treatment of signal value V2 as represented at line 124; secondary voltage level corresponding with the treatment of voltage output V1 at line 126 and a fault status output representing that fault condition exists which is provided at line 128. Lines 124, 126 and 128 are directed to corresponding data buffer circuits shown, respectively, at 130, 132 and 134. Circuits 130, 132 and 134 are enabled from the control circuitry at 104 by appropriate signals represented to be introduced thereto from respective lines 136-138. The resultant buffer data then are introduced to the principal data-address bus 116 to the control function 101 for treatment.

Bus 116 also is shown directed to the input terminals of a fault status register represented at block 140 which is enabled from the control circuitry 104 as represented at line 142. Register 140 serves to provide output signals as represented at lines 144a and 144b corresponding with each of the plurality of channels, for example 16, involved. These signals at lines 144a and 144b are converted to LED drive signals by driver-buffer components as at 146a and 146b to selectively effect the illumination of the light emitting diodes (LEDs) as at 148a and 148b. Such an arrangement provides an immediate indication to the operator of a fault categorized switching input status in a given channel. As is apparent, an active low at the outputs of buffers 146a and 146b will effect illumination of the corresponding LEDs 148a and 148b.

Looking to the control function 101, conventional microprocessor based control functions are provided, for example, a microprocessor such as a Mostek type Z80A as represented at block 152, while associated random access memory (RAM) and read only memory (ROM) are shown, respectively, at blocks 154 and 156. To provide serial intercommunication where desired, dual, asynchronous receiver transmitters may be provided as represented at blocks 158 and 160.

The operational theory behind the fault status identification feature of the module or circuit 100 is revealed in general in FIG. 6. Looking to that figure, a field contact is represented as a switch 166 having a high voltage side (V1) field wire 168 attached thereto at one input and a corresponding low voltage side (V2) field wire attached thereto at line 170. Intermediate the field wires 168 and 170, however, there is provided the earlier-noted bias responsive device now represented by a dotted boundary 106. This bias response function includes fuses 172 and 173 coupled with respective lines 168 and 170 as well as resistors 174 and 176. Resistor 176 is seen to be coupled across lines 168 and 170, while resistor 174 is positioned within line 168. These resistors 174 and 176, together with the contact resistance, form a resistor network that cause the voltages V1 and V2 to develop. The value of resistor 174 may, for example, be selected as 2.4K, while that of resistor 176 may be 3.3K. Note, additionally, that line 168 is coupled through resistor 178 (2K) to +15 v supply, while, correspondingly, resistor 180 (8.2K) is connected from line 170 to −15 v. With the arrangement shown, a variety of voltage states (V1, V2) for output conditions V1, V2 can be evolved depending upon the condition of the field wiring and/or switch 166. For example, referring to FIG. 7A and assigning the labelled values for resistance, when the contact of switch 166 is open, the resistor 174 is open circuited and the interface sees only resistor 176 in series with the resistance of the field wires 168 and 170 forming the voltage divider shown. Conversely, when the contact or switch 166 is closed, resistor 174 and the contact resistance of switch 166 appear in parallel with resistor 176 as represented in FIG. 7B. In effect, substantially unique voltage values can be evolved for a broad variety of states of the field wires 168 and 170 as well as switch 166 as are set forth in FIG. 8. The information shown in FIG. 8 can be utilized to derive a sequence of logic conditions to achieve not only contact status information but also fault status information.

Referring to FIG. 9, the logic conditions for determining contact and field wire status with respect to the low wire 170 or V2 status are revealed. Note that a threshold of 4.5 volts separates an open and closed status for switch 166 and the voltage range at V2 which can occur for these two conditions is from 1.5 v to 7.5 v. Any voltage condition not falling within that range represents a fault. In this regard, as may be seen from the figure, a condition of V2 falling between −1.0 v and 1.5 v represents that the low wire 170 is grounded. Similarly, a condition of the voltage V2 falling between −3.35 v and −1.0 v represents that the hi wire 168 is grounded and the contact or switch 166 is closed. Where the voltage V2 is between −6.0 v and −3.35 v, a condition obtains wherein the contact or switch 166 is open and the Hi field wire 168 is grounded. Note that even with grounded field wires, the output permits an identification of the status of the contacts of switch 166. Normally no reading as to that information would be available. In similar fashion, a reading above 7.5 volts will represent a shorting together of lines 168 and 170. These threshold values are utilized as inputs to comparator stages, the inputs being generated from the control circuit 104 (FIG. 5) in the hexadecimal form as shown below the labelled threshold values.

Now looking to the logic available with respect to the Hi line 168 or voltage V1, reference is made to FIG. 10. In this regard, where a determination has been made from FIG. 9 that the low field wire 170 has been grounded, then it is necessary to make a threshold comparison with respect to voltage V1 at line 168 to determine the state of the contact to switch 166. For example, in FIG. 10, where the V1 threshold is above 7.8 volts, then an indication is present that the contacts are open and the Lo line 170 is grounded. In similar fashion, where the value V1 falls between 3.0 v and 7.8 v, and the low line is grounded, then it will be known that the contacts of switch 166 are closed. Where the value V1 falls below 3.0 v and the low field line 170 is grounded, then it will be known that the field lines 168 and 170 are shorted as well as grounded.

Additionally, logic is provided such that where the low level V2 is less than 1.5 v, a voltage at the high level, V1 falls below 9.5 volts or voltage greater than 7.5 volts falls on the low level, V2, then a fault status bit is activated for the purpose of conserving computational time, a variety of comparisons and the like not being required under normal status conditions and thus, such operations can be avoided.

Returning to FIG. 6, with the operation of digital-to-analog converter 112, (FIG. 5) a series of threshold values can be imposed as represented at lines 182 and 183 to one input of respective comparators 185 and 186. The opposite inputs to these comparators emanate from lines 168 and 170, line 168 being directed to comparator 186 and line 170 being directed to comparator 185. With his arrangement, the comparators can be controlled to provide a sequence of evaluations and the resultant outputs, which will be found to be two in nature as designated primary and secondary. Primary outputs are associated with the logic of FIG. 9 and secondary outputs are represented with the logic of FIG. 10. These outputs for comparators 185 and 186 are shown at lines 188 and 189, respectively. The third output for the logic arrangement concerns the noted fault detect function which is herein represented at block 190 having inputs from lines 168 and 170 provided thereto from along respective lines 192 and 193 to provide a third logic output at line 194 representing a fault status bit.

Figure 11:
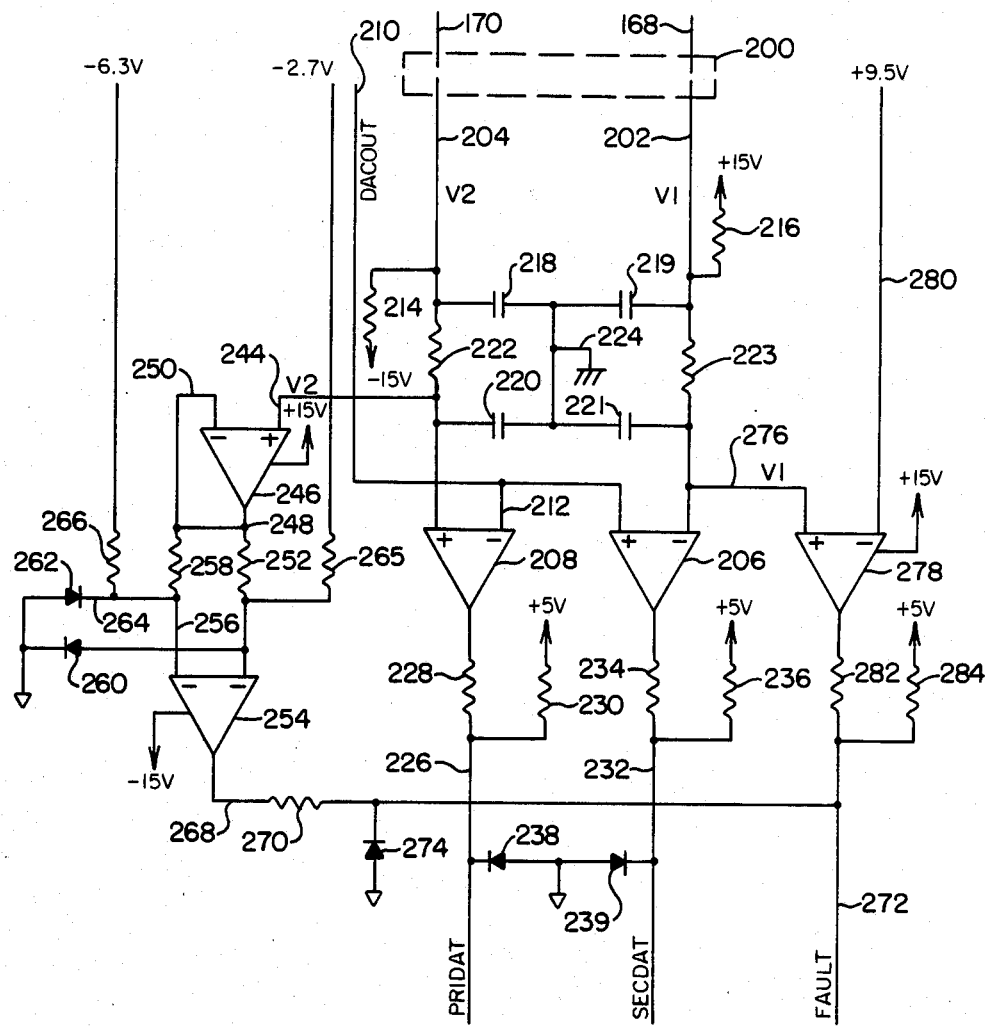
FIG. 11 is an electrical schematic diagram of signal conditioning and level comparator features shown in FIG. 5.

Referring to FIG. 11, a schematic circuit diagram is provided at a still higher level of detail showing the fault detection networks as represented at block 190, the comparison network including comparators 185 and 186 and the surge protection and contact debounce network components described earlier in conjunction with blocks 104a and 104b of FIG. 5. The circuit of FIG. 11 is one associated with a singular module and it is repeated in that module in conjunction with each of the plurality of channels accommodated by the module. Accordingly, a contact and field wire evaluation is carried out in hardware for each channel. The terminal block for the instant module is represented in dashed form at 200 and is shown receiving field wires 168 and 170 as described in conjunction with FIG. 6. These wires, respectively carrying the earlier-noted voltage conditions V1 and V2, lead respectively into lines 202 and 204 which are directed to the respective negative and positive input terminals of comparators 206 and 208. These comparators correspond, respectively, with comparators 186 and 185 in FIG. 6 and may be provided, for example, as a type LM2901. The various threshold levels selected by the control function 104 and developed from digital-to-analog converter 112 are provided as a signal identified as DACOUT and presented at line 210 to the positive input terminal of comparator 206 and additionally through line 212 to the negative input terminal of comparator 208. Line 204 is pulled toward −15 v by a resistor 214 while line 202 is pulled to +15 v through resistor 216. Resistors 214 and 216 correspond with respective resistors 180 and 178 in FIG. 6.

The debounce and surge protection network described in conjunction with blocks 104a–104b in FIG. 5 is present in the instant figure as capacitors 218–221 operating in conjunction with resistors 222 and 223 as well as with the surge ground through line 224. With the arrangement shown, primary data resulting in threshold evaluations with respect to the signal V2 are presented at line 226 through resistor 228 as an active logic low signal identified as PRIDAT. Note that line 226 is pulled up through resistor 230 to +5 v. Similarly, the output of comparator 206 relating to threshold evaluations of the voltage V1 are provided at line 232 through resistor 234 and are designated SECDAT or secondary data. Line 232 is pulled up to +5 v through resistor 236 to effect an active logic low for line 232 and the SECDAT signal. Diodes 238 and 239 extending between lines 226 and 232 to ground serve to clamp the low state of these lines to ground. The primary data designation for line 226 stems from the observation which can be made with respect to FIGS. 9 and 10 that the bulk of data developed with this system is evolved in conjunction with voltage level V2 and the noted thresholds. By comparison, the voltage V1 is utilized only for low wire ground and thus is designated secondary data.

As noted above, in order to conserve processing time, each channel of the contact input process interface contains hardware generating a false status bit which can be polled and in the absence of such a status bit, data are read only for the contacts of switch 166 being open or closed. This is done by reading the voltage value V2 for the open or closed status. A first component of the false status network receives the voltage value V2 from along lines 204 and 244, the latter being directed to the positive input terminal of a buffer amplifier 246 which may be provided as a type LM2904. Amplifier 246 repeats the V2 signal at its output at line 248 which is then directed to the negative terminal input thereof via line 250 and also through resistor 252 to the positive input terminal of a window comparator structured utilizing an operational amplifier 254 present as a type LM2901. This signal at line 248 is also summed with a −2.7 v input asserted from a reference source through resistor 265.

The opposite or negative input terminal to amplifier 254 is provided from line 256 which extends through resistor 258 to line 250. A dual threshold window comparator function is achieved through the coupling of diode 260 between ground and line 248 and diode 262 within line 264 between line 256 and the same ground. Line 264 is coupled with a −6.3 v supply through resistor 266. The output of amplifier 254 will be an active low and is presented at line 268 containing resistor 270 and which is coupled to line 272. As before, a diode 274 coupled between line 268 and ground insures TTL level signals by clamping the low state of these lines to ground. Where the voltage V2 at line 244 does fall within the window range of 1.5 v to 7.5 v, then a fault is at hand and an active low is developed at line 268.

The next comparative requirement to achieve fault status involves the evaluation of voltage V1 at line 202 to detect any presence of a low wire ground. As earlier discussed, where this voltage value exceeds +9.5 v, then the second and final requirement for determining the fault status is provided. Accordingly, the V1 voltage is directed from line 202 via line 276 to the positive input of an operational amplifier 278 which may be provided as a type LM2901. An opposite or negative terminal input to amplifier 278 is provided from line 280 carrying a +9.5 v reference voltage. The resultant active low output of amplifier 278 at line 272 is directed through resistor 282. As before, line 272 is maintained at positive potential by connection through pull-up resistor 284 to +5 v. Looking momentarily to FIG. 12, the +9.5 v voltage generation network is revealed. This network includes a resistor chain comprised of line 290 including resistors 292–294 coupled between +15 v and ground. Resistor 293 is provided as a potentiometer which is tapped by wiper arm 296 leading, in turn, to the positive terminal of operational amplifier 298 which may be provided, for example, as a type LM2904. The output of amplifier 298 is provided at earlier-noted line 280 (FIG. 11) which line is coupled in feedback fashion by line 298 to the negative terminal input of the amplifier. The same structure may be utilized for developing the noted voltage levels directed through resistors 265 and 266 in conjunction with window comparator 254. For that figuration, the same amplifier type is utilized in conjunction with the same form of resistor string but coupled between ground and −15 v supply. FIG. 5 revealed that the primary secondary and fault status outputs for each channel of the contact input process interface were directed to data buffers then described at 130, 132 and 134 which serve to introduce the data from all channels into the data and address bus 116 of the process control function 104. Looking to FIG. 13, a more detailed implementation of this function is revealed. Referring to FIG. 13, assuming a 16 channel implementation, eight of the channel leads corresponding with a fault status carrying line 272 are directed to assigned input terminals of data buffers 300 and 310. In this regard, discrete leads of lead array 304 carrying FAULT ON–07N components of the FAULT signal are shown directed to latch 300, while the outputs thereof at lead array 306 are directed to the principal data and address bus of control 104 as described earlier herein at 116. The buffer 300 additionally is shown being enabled from line 308 carrying the enabling signal designated FAULTEN 0 which emanates from the microprocessor function 152 following decoding. An array of similar latches are provided for the remaining data which are shown in the drawing at 310-314 in conjunction with simplified representations of the lead arrays as at 304. In this regard, the next eight lead inputs carrying fault status information and identified as FAULT 8N-15N are represented at arrow 316, while the enabling input to the buffer 310 is shown at line 318 as carrying the signal FAULTEN 1. The multi-lead array output of buffer 310 is represented by arrow 320 being directed for coupling with bus 116.

Secondary data as represented in FIG. 11 at line 232 are directed for each of the channels 00-07 carrying the SECDAT label via lead array represented by arrow 322 to buffer 311 which, when enabled from line 324 carrying the SECDEN 0 enabling signal, transfers the secondary data for those eight channels to bus 16 through a lead array represented by arrow 326. Similarly, SECDAT signals 08-15 are carried by the lead array represented by arrow 328 to the inputs of data buffer 312. Buffer 312 is enabled from line 330 carrying an SECDEN 1 signal derived following decoding from microprocessor 152 and serves to permit the outputting of the secondary data for those eight channels along a lead array represented by arrow 332 for connection with bus 116.

Primary data for eight channels represented as signals PRIDAT 00-07 corresponding with line 226 in FIG. 11 are submitted to buffer 313 by a lead array represented by arrow 334 and are presented to output lead array 338 upon a presentation of an enabling signal, PRIDEN 0 at line 336. Line 338, as before, is coupled with bus 116. Finally, the remaining eight channels carrying primary data and designated as signals PRIDAT 08-15 are presented along a lead array represented by arrow 340 to data buffer 314 and are transferred to bus 116 upon presentation of an enabling signal designated PRIDEN 1 along line 342.

Looking to FIG. 14, the address decoding arrangement for providing enablement to data buffers 300 and 310-314 is revealed. Enablement addressing is carried out by binary logic applied through three lines, 344-346 carrying signals designated A0-A2 from the microprocessor 152 (FIG. 5) which are directed to decoder 348 in conjunction with enabling inputs at lines 350 and 351 carrying, respectively, strobe, STB3 and read not, RDN, signals also from the microprocessor. Decoder 348 which, for example, may be provided as a type 54LS138, responds to these commands and elects the enabling addresses at its output lines as earlier described at 308, 318, 324, 330, 336 and 342.

Threshold values which are directed to the level comparators as at 206 and 208 are developed by the microprocessor 152 as binary inputs to a digital-to-analog converter 112. FIG. 15 shows the data bus 116 which will carry such binary data being directed to a latch 354 which may, for example, be provided as a type 54LS374. Latch 354 is enabled by signals from the microprocessor at lines 356 and 357 respectively carrying signals designated STB4N and write not, WRN. These signals are combined at negative NAND gate 358 for introduction to the latch 354. The output of latch 354 is submitted as an eight line lead array 360 carrying signals DAC0-DAC7 which are directed to the input of the digital-to-analog converter for each multi-channel module.

Looking to FIG. 16, these same signals are shown introduced to digital-to-analog converter component 362. Component 362 may be provided, for example, as a type DAC0808 and receives a plus voltage reference through resistor 364 which is coupled to +15 v and a −VREF input from resistor 366 which is coupled to ground. The output of component 362 at line 368 corresponds with the digital value asserted from lead array 360 and will be provided as a current varying from 0 to about 2 milliamps. Inasmuch as the analog output required is within a range of ±12 volts, the output at line 368 is directed both to line 370 which is directed to the negative input of an operational amplifier 372 and to line 374 which is coupled through resistor 376 to +15 v. Line 374 also extends through resistor 378 to output line 380 of amplifier 372. Being present, for example, as a type LF256, the positive input amplifier 372 is coupled through resistor 382 to ground. In operation, the output at line 368 may serve as a sink to the bias provided at line 374 to achieve the requisite voltage range required at line 380. Note that this analog output at line 380 is labelled as carrying the signal DACOUT. This same signal will be seen to be presented, for example, at line 210 in FIG. 11 which is directed to the comparators 206 and 208.

Figure 17A:
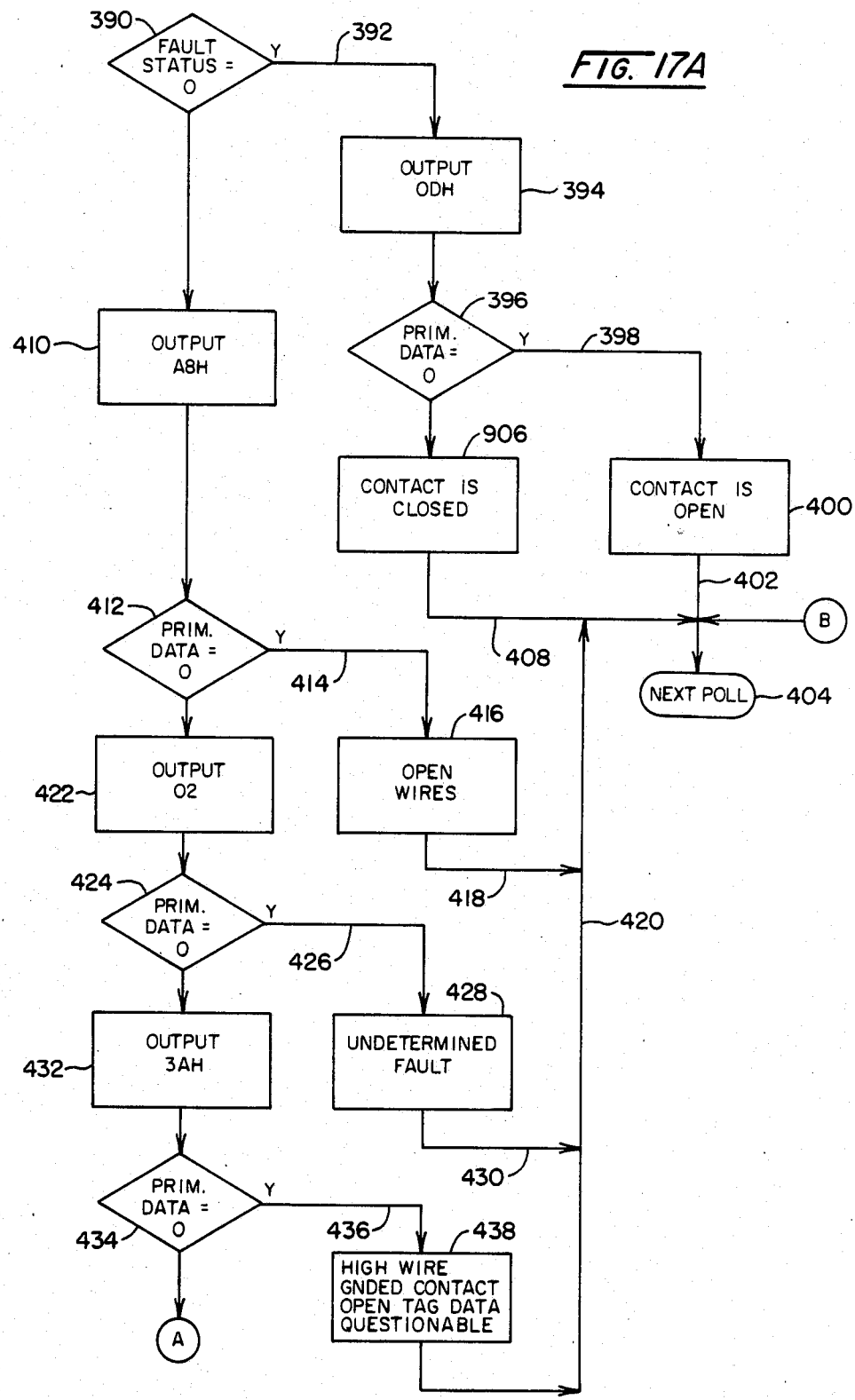
FIGS. 17A and 17B combine to provide a flow chart showing the control program for the control features of the system of FIG. 5.
Figure 17B:
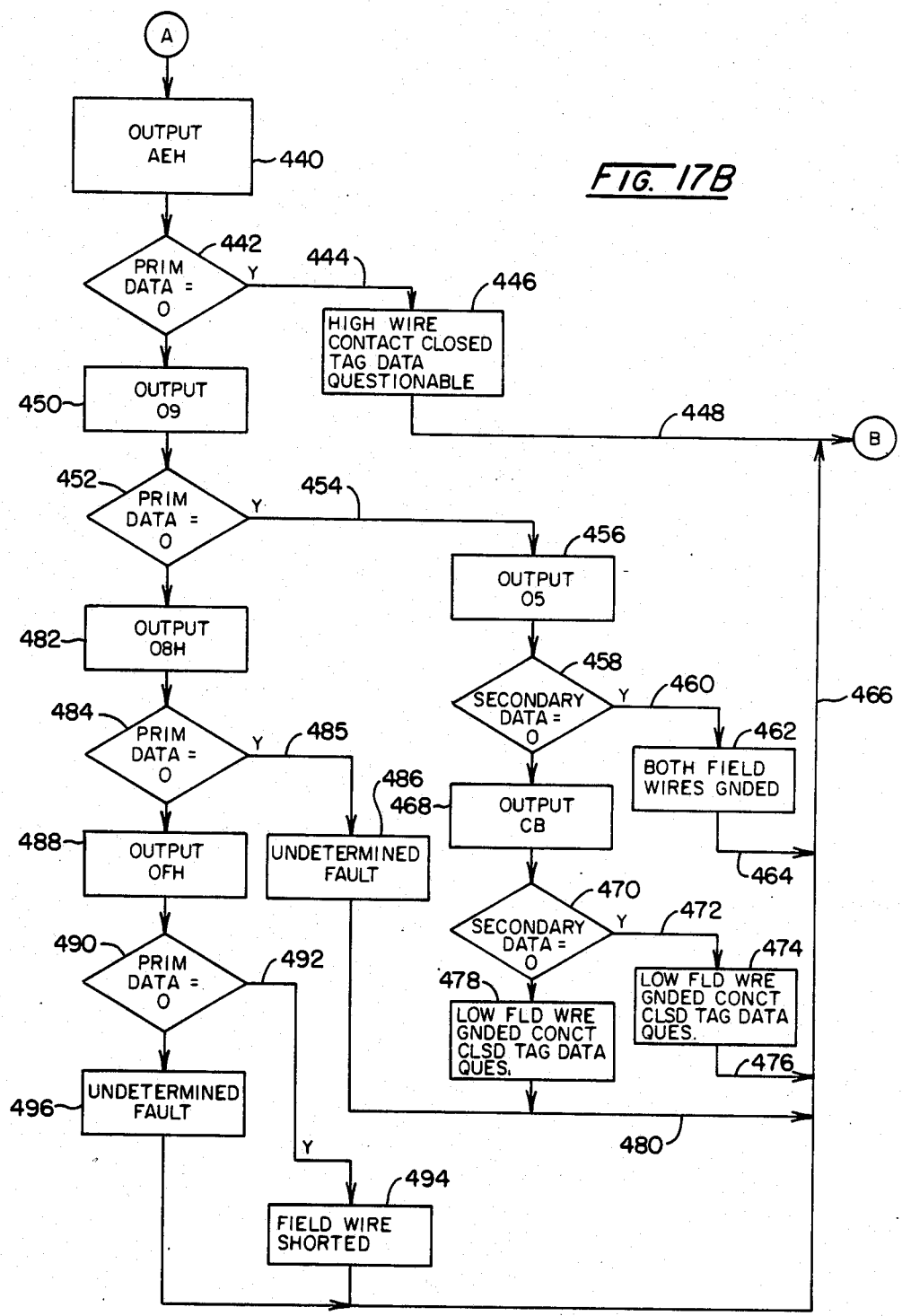

Referring to FIGS. 17A and 17B, the program under which control is asserted by the microprocessor function 152 under the direction of the instructions of read only memory 156 with respect to the instant contact input process interface circuit are revealed in flow diagrammatic fashion. Looking to FIG. 17A, the program routine commences with the inquiry presented at block 390 determining whether or not a fault status output signal for a predetermined channel polled in a succession of such channels has a 0 value. Recall that this information is gleened from the outputs of data buses 300 and 310. If the inquiry results in an affirmative response, no fault is indicated to be present and the program diverts to a shortened routine represented by lines 392 and 394 wherein the hexadecimal value 0D as described in FIG. 9 is outputted to determine the condition of contact closure. The routine then progresses to the inquiry at block 396 determining whether the primary data output for the instant channel is 0. In the event of an affirmative response, then as represented by line 398 and block 400, an indication is present that the contact is open, for example, the switch 166 has an open orientation (FIG. 6). Then, as represented at line 402 and node 404 the routine progresses to poll the next channel for fault status as represented at block 390.

In the event the inquiry at block 396 shows that the primary data signal is not 0, then, as represented at block 406, an indication is present that the contact is closed and, as represented by line 408, the routine progresses to poll the next channels as represented at node 404.

Returning to block 390, in the event that the fault status indication is 0, then a fault is considered to be present and the program progresses to the instructions at block 410 wherein the digital-to-analog converter is given an A8 hexadecimal instruction representing the first threshold value of −10 v as set forth at FIG. 9. Note that this first threshold is concerned with V2 voltage thresholds. The program then again determines whether the subject channel primary data output is 0 and, in the event that it is, as represented at line 414 and block 416, an indication is present that the fault at hand is one of open wires. The program then diverts, as represented at lines 418 and 420 to node 404, whereupon the fault status inquiry of block 390 is asserted with respect to the next sequential channel to be polled.

In the event the inquiry at block 412 results in a negative determination, then as represented at block 422, the next successive threshold level, as set forth in FIG. 9, is outputted to the digital-to-analog converter 362 as represented by the hexadecimal value 02. The program then inquires, as represented at block 424, as to whether the primary data lead has a logic 0 level and, in the presence of an affirmative determination, as represented at line 426 and block 428, a determination then is made that an undetermined fault is at hand. A return then is made to carry out a next channel determination as represented by line 430 and 420 leading to node 404.

In the event the inquiry at block 424 results in a negative response, then as represented at block 432 the next successive threshold level as represented by hexadecimal 3A, is outputted and, as represented at block 434, the primary data outputs are again evaluated for a 0 status. In the event of a 0 status, then as represented by line 436 and block 438, an indication is provided that the Hi wire is grounded and the contacts are open. Further, information is provided that the data derived is questionable. The program then diverts as shown at line 420 and node 404 to poll the next channel commencing with the inquiry at block 390. In the event the inquiry at block 434 shows that the primary data output is not 0, then as indicated by connector A, the program commences to the instructions at block 440 in FIG. 17B to output the hexadecimal value AE to the digital-to-analog converter. A determination then is made as represented at block 442 as to whether the primary data of the examined channel is 0, and in the event that it is, then as represented by line 444 and block 446, an indication is provided that the high wire is grounded, the contact is closed and a questionable data message is provided. The program then exits as represented by line 448 and node B to node 404 wherein the next channel is polled.

In the event the inquiry at block 442 indicates that a primary data active logic signal is not present, then as represented at block 450 the hexadecimal value 09 is outputted to the digital-to-analog converter and a threshold comparison is made. The primary data outputs then are examined as represented at block 452 where an active low is present, as represented at line 454 and block 456, the hexadecimal value 05 corresponding with voltage V1 and FIG. 10 is outputted, a low ground being indicated. The program then progresses to the inquiry at block 458 wherein the secondary data input for the instant channel is examined with respect to whether is has a 0 value. In the event that it does, then as represented by line 460 and block 462, an indication is provided that both field wires are grounded. The program then returns as represented by lines 464, 466, node B and node 404 to poll the next channel.

Where the inquiry at block 458 indicates that no secondary data output is present, then as represented at block 468, the microprocessor outputs the hexadecimal threshold value CB representing the next threshold for the V1 voltage values as represented at FIG. 10. The program then again inquires as to the presence of a secondary data output as represented at block 470 and in the event of an affirmative response, as represented by line 472 and block 474, an indication of a low field wire ground in combination with a closed contact is present. A data questionable informational output also is generated. The program then exits as represented at lines 476, 466 and node 404 to poll the next channel.

In the event that the inquiry at block 470 results in a negative response, then as represented at block 478 a condition wherein the low field wire is grounded and the contacts are open obtains. Additionally, the program puts out a questionable data warning to the user and exits as represented at lines 480, 466 and node 404 to poll the next channel.

Returning to block 452, where the inquiry results in a determination that no primary data outputs are present, then as represented at block 482, the hexadecimal value 0B is outputtted and, as represented at block 484, an inquiry is made as to whether the primary data signal is at logic 0. In the event that it is, then as represented by line 485 and block 486, an undetermined fault is at hand and as represented by lines 480, 466 and node 404, the program exits to poll the next channel.

Where the query at block 484 indicates that no primary data signal is present, then as represented at block 488, the threshold value corresponding with hexadecimal 0F is outputted and, as represented at block 490 an inquiry is made as to whether the primary data has a logic 0 level. In the event that it does, then as represented by line 492, the program progresses to block 494 wherein information is outputted that the field wires are shorted. The program then exits as represented by line 466 and node 404 to poll the next channel. In the event the inquiry at block 490 indicates no primary data signal is present, then as represented at block 496, an undetermined fault message is derived for outputting. The program then exits as represented at line 466 and node 404 to poll the next channel.

ISOLATED ELECTRONIC SWITCH OUTPUT

Another process input and output modular function provided by the control unit 10 has been described in FIG. 3 as a switch output wherein a digital form of output is provided and supplied to a load through two field wires. This process feature of the invention provides for the switching of up to 0.5 amperes of current at 30 volts through such a given or target load electronically under conditions wherein the switch is isolated to 1,000 volts from the potential of the control ground system. User convenience is enhanced through the coupling of battery or the like inputs to the terminal block of the process input/output function 28 itself such that the user need only connect two terminals to provide switching actuation asserting current to a load. Of particular importance, however, this feature of the invention permits a broad variety of status monitoring checks including the detection of output overload; the detection of absence of an output load; the absence of battery power; the detection of a switch which remains always open or, conversely, the detection of the condition of a switch which remains always closed. As before, the instant output isolated electronic switch module operates in conjunction with a hardware component (switch output process interface) and an associated microprocessor based control (switch output process control) in similar fashion as the arrangement described in conjunction with the contact input process interface described in connection with FIG. 5. Accordingly, the standardized microprocessor related components including RAM, ROM and communications devices are not shown in the instant series of figures.

Figure 18:
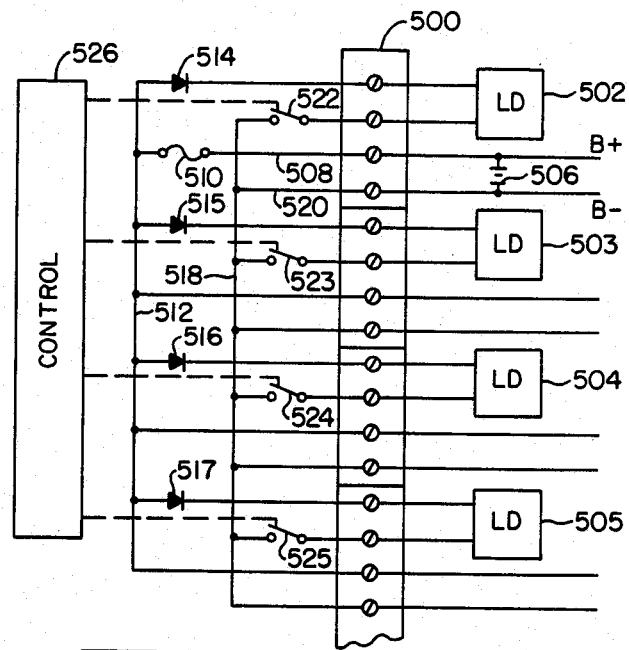
FIG. 18 is a diagrammatic and schematic view of a terminal block for an isolated electronic switch output module.

Referring to FIG. 18, a portion of the terminal block 500 utilized in conjunction with the instant module and positioned within the process input and output function 28 of control unit 10 is schematically portrayed. This block 500 is shown to accommodate two field wire leads each to four loads of an industrial process represented at 502-505. A singular battery 506 is also connected to the terminal block 500 and is shown having its positive, B+ terminal extending from the terminal block via line 508 and fuse 510 to a common distribution line 512. From line 512, the B+ input is directed through diodes 514-517 to one side of respective loads 502-505. From the loads 502-505 and their field wires, the circuit returns to common line 518, line 520 and the opposite or B-side of battery 506 through a series of solid-state switches shown, respectively, at 522-525. Switches 522-525 are controlled from the microprocessor based control function of the isolated electronic switch arrangement as represented by block 526 and the dotted connecting lines extending to the switches. As is apparent, the user of the module need not carry out the wiring of a separate battery for each load with the arrangement shown. Further, it will be seen that through this interconnection of the battery at terminal block 500, a considerable amount of information becomes available as to battery status, i.e. the presence of power, the presence of load and the determination of whether current is passing to the load. It might be observed that with the embodiment of FIG. 18, four channels of connection to four separate loads are provided with one battery, however, it may be observed that more loads can be associated with the battery if desired.

Figure 19:
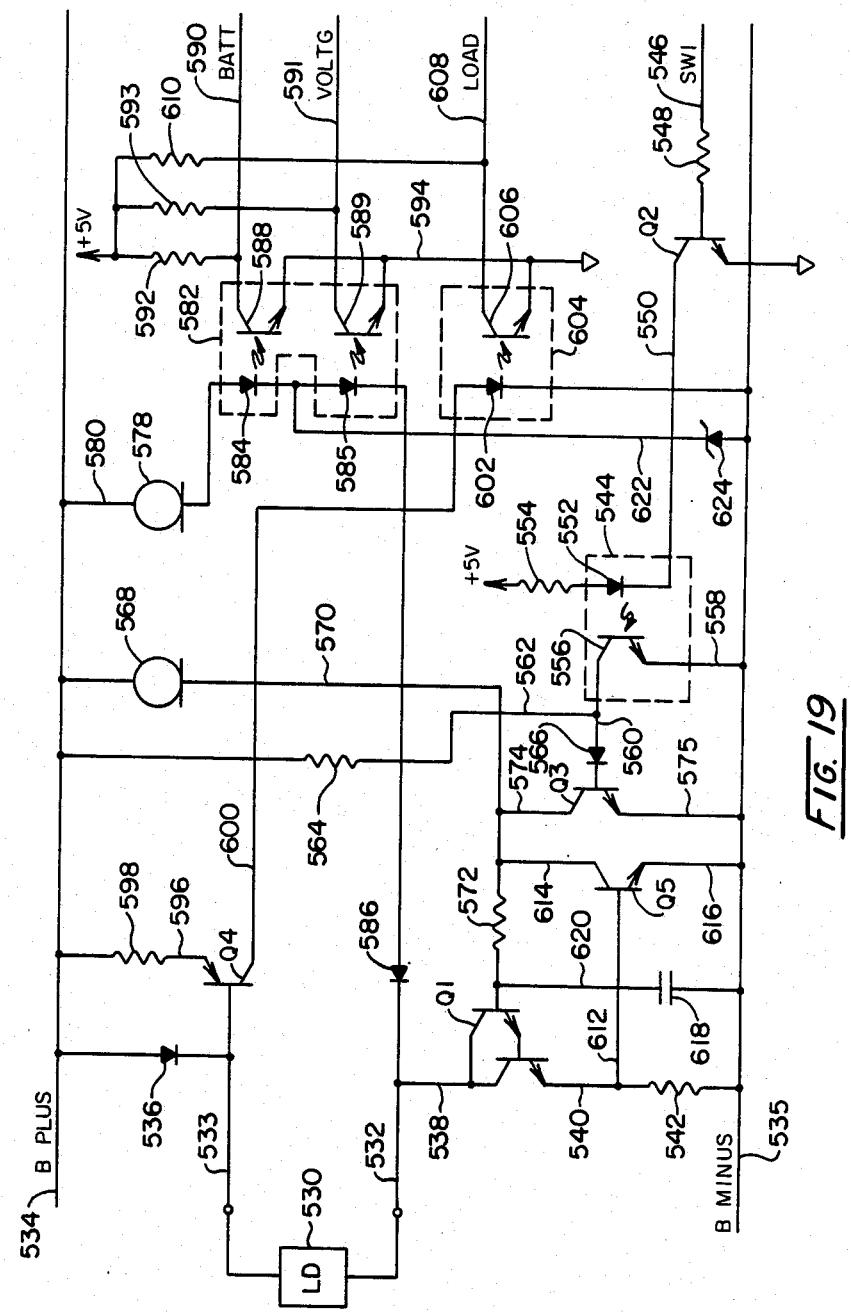
FIG. 19 is an electrical schematic diagram of an isolated electric switch output according to the invention.

Looking to FIG. 19, a schematic representation of a circuit intended for utilization with one channel of the instant process interface module is revealed. In the figure, a target or representative load is shown at block 530 being coupled through terminals to lines 532 and 533. Battery power is supplied to the circuit with respect to B+ from line 534, while the corresponding B— supply from the battery is coupled at line 535. Power is switched to the load 530 from a power Darlington transistor Q1 which may be provided, for example, as a type TIP120. When activated, transistor Q1 draws current from the B+ line 534 through a diode 536, line 533 and the load 530, thence through line 532, line 538, transistor Q1, which will be in a saturated state, line 540, incorporating resistor 542, to B— line 535. Darlington transistor Q1 is turned on from an isolating opto-transistor shown within the optical isolator dotted boundary 544. Device 544 serves to provide the noted 1,000 volt isolation while turning transisor (switch) Q1 on. The switching input developed from the thus isolated process control is provided from along line 546 which is directed through resistor 548 to the base of NPN transistor Q2, the emitter of which is coupled to ground and the collector of which is coupled through line 550 to one side of opto-diode 552 of the isolated transistor assembly 544. The opposite side of diode 552 is shown coupled through resistor 554 to +5 v source. The signal at line 546 will emanate from a latch activated by the microprocessor of the control and will serve to turn transistor Q2 on and thus activate and illuminate opto-diode 552. This, in turn, turns on photo- or opto-transistor 556 whose emitter is coupled via line 558 to line 535 and whose collector is coupled by line 560 and line 562 through resistor 564 to line 534. When thus turned on, transistor 556 becomes saturated and the voltage level at line 560 is reduced, for example, to the region of about 0.6 volts. A diode 566 in line 560 is shown positioned before the base of another NPN transistor Q3 and functions to hold transistor Q3 in an off state by reducing the available bias asserted thereto. Transistor Q3 remaining off, there then exists sufficient current passing from constant current diode 568 in line 570 to effect the forward biasing of Darlington transistor pair Q1 through base resistor 572. Removal of the switching input at line 546 on the part of the control function, in turn, turns off the opto-diode 552 to, in turn, permit sufficient bias to be asserted through diode 566 in line 560 to the base of transistor Q3, thus, to effect the shunting of current from line 570 through lines 574 and 575 to line 535.

Under the noted normal conditions of operation, assuming transistor Q1 is on, it will become saturated. Therefore, a maximum of about a 1 volt drop will occur between the collector of transistor Q1 and line 535. Under such conditions, a current flow path exists from line 534 through another constant current diode 578 within line 580. Line 580, in turn, leads to another isolating photo-optic component 582 which includes photo-optic or photo-emissive diodes 584 and 585. Diode 585 is coupled via line 532, incorporating a diode 586, to line 538 and the collector of Darlington transistor pair Q1. Accordingly, when the latter transistor Q1 is saturated under normal conditions, the resultant voltage thereat will be sufficient for current flow to effect the photo-emission activity of diodes 584 and 585 to turn on dielectrically isolated respective opto-transistors or photoresponsive components 588 and 589. The collectors of opto-transistors 588 and 589 are coupled through respective lines 590 and 591 to +5 v through pull-up resistors 592 and 593. The emitters of transistors 588 and 589 are coupled in common to ground through line 594. Accordingly, under normal conditions, the current flowing through diode 578 will be adequate to activate diodes 584 and 585, to turn on transistors 588 and 589 and thus assert logic active low signals at lines 590 and 591.

Now considering the monitoring of current through the load, when such current is flowing through the load, the only path which it has available to follow is from line 534 (B+) through diode 536 and the load and thence through transistor Q1 to line 535. This serves to generate a voltage drop across diode 536 and effect turning on of PNP transistor Q4. The emitter of transistor Q4 is coupled via line 596 and current limiting resistor 598 to line 534, while the collector thereof is coupled via line 600 and opto-diode 602 of opto-isolator 604 to B— at line 535. Resistor 598 limits the current out of transistor Q4 to about 3 milliamps which, in turn, evolves photoemission from diode 602 to turn on opto-transistor 606. The collector of transistor 606 is coupled through line 608 and pull-up resistor 610 to +5 v supply, while the emitter thereof is coupled through line 594 to ground. Thus, when sufficient current is passing to the load 530, line 608 carries an active logic low signal. The signals at line 608 can provide information showing that if the transistor Q1 is supposed to be off but current is present, a fault is at hand and similarly, if transistor Q1 is on and no current is observed, then a fault situation also exists. In particular, these signals are concerned with the status of activity with respect to the load and the signal and line 608 is so labelled LOAD. As indicated above, under normal conditions, the Darlington transistor pair Q1, when operating to power load 530, will assume a saturated state. However, as unacceptable conditions commence to occur, for example, the development of a level of current through transistor Q1 higher than specified or about one-half ampere, the voltage generated by said current at line 540, by passing through resistor 542 will be presented through the base of NPN transistor Q5. The collector of transistor Q5 is coupled via line 614 to line 570, while the emitter thereof is coupled through line 616 to line 535. Accordingly, as the current values increase at line 540 through transistor Q1, transistor Q5 will commence to turn on and shunt the fixed current level at line 570 otherwise asserted at the base of transistor Q1. As a consequence, a current limiting of the output of the transistor Q1 occurs and transistor Q1 is brought out of a saturation state. A capacitor 618 within line 620 extending between the base of transistor Q1 and line 535 serves a frequency compensation function for the feedback circuit necessarily involved.

When an overload condition occurs, Darlington transistor pair Q1 will commence to move out of a saturated state and as a consequence, voltage at its collector at line 538 will commence to rise. Note additionally, that the anode side of opto-transistor 585 is coupled by line 622 through a Zenner diode 624 to line 535. Thus, with an overload condition at transistor Q1, the Zenner diode 624 will attempt to maintain its voltage readings while the rising voltage drop asserted at Darlington transistor pair Q1 will commence to effect a back-biasing at diode 586 and, in consequence, opto-diode 585. Thus, the signal at line 591 will assume a logic high. Line 591, thus may determine whether the switch or transistor Q1 is in a saturated state representing a proper load condition and if it is not saturated, an overload condition may be at hand. On the other hand, where the signal value at line 591 is an active low and the transistor Q1 is supposed to be in an off state, a fault is at hand such as may be represented by the shorting of transistor Q1 or some external by-pass. In effect, line 591 basically monitors the output voltage between the battery terminal and the switch or Darlington connector transistor pair Q1. Accordingly, the line is shown providing a signal designated VOLTG. On the other hand, line 590 serves to indicate the presence of adequate battery voltage or the presence of a battery (source status) and is labelled BATT.

Figure 20:
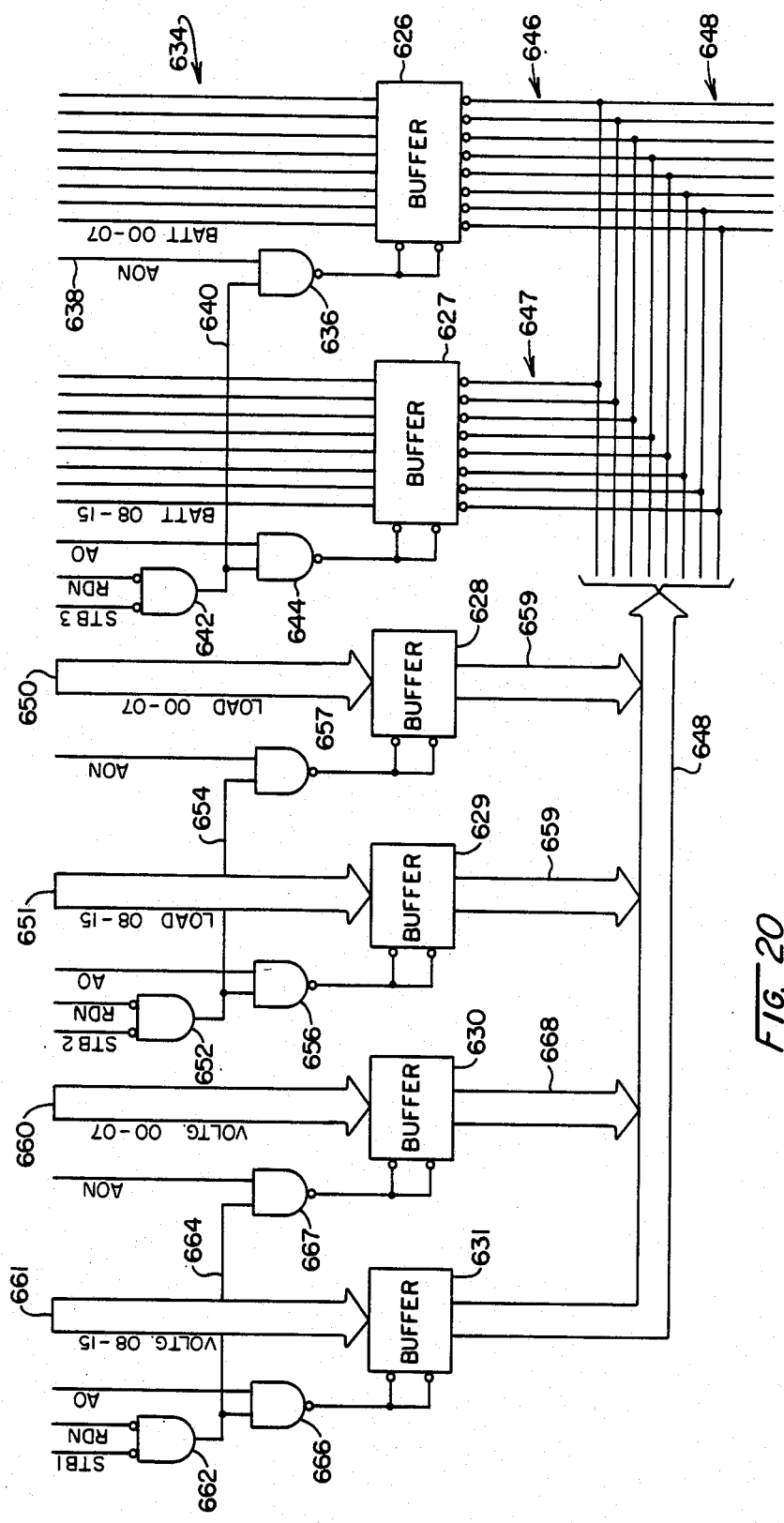
FIG. 20 is a schematic diagram showing buffer inputs to a control bus.

Lines 590, 591 and 608 are polled for each channel of the processing module by the microprocessor based controls thereof and this procedure is carried out, as above, through the utilization of a series of bus drivers illustrated in FIG. 20. Referring to that figure, the buffers or bus drivers, which may be present, for example as type 54LS240, are shown at 626–631. Driver 626 is shown having a lead array input at 634, each lead within the array emanating from a channel and corresponding to line 590 in FIG. 19. Buffer 626 is enabled from NAND gate 636 which receives one enablement signal from the microprocessor of the control labelled A0N at line 638 and an additional input from line 640. Line 640, in turn, is connected to the output of gate 642 which, in turn, is activated with the receipt of a designated strobe, STB1, and read not, RDN, signal from the microprocessor control. Gate 642 provides inputs both to gate 636 and NAND gate 644 serving additionally to enable buffer 627. This latter buffer is seen to receive the remaining eight channel input, BATT08–15 for a 16 channel module. The outputs of buffers 626 and 627 are shown at respective lead arrays 646 and 647 being coupled to the data and address 648 of the microprocessor based control for the module. Looking to the simplified remainder of the figure, it may be observed that the inputs to buffers 628 and 629 are coupled with eight lead arrays represented by arrows 650 and 651. These lead arrays, labelled LOAD00–07 and LOAD08–15 represent 16 lead inputs corresponding to line 608 in FIG. 19. The buffer combination is enabled from the microprocessor control with the assertion of strobe, STB2, read not, RDN, and A0. The former two of these signals is directed to negative AND gate 652, the output of which at line 654 is directed to NAND gates 656 and 657. Thus the output at line 654 coupled with A0 or A0N will effect the selective enablement of buffer 628 and 629. The eight lead outputs of buffers 628 and 619 are shown, respectively, by arrows 658 and 659 leading to communication with bus 648.

Buffers 630 and 631 are coupled with eight line lead arrays represented by respective arrows 660 and 661. These lead arrays as at 660 and 661 carry the signal designated VOLTG for the numerically designated channels 00 through 15. As is apparent, the individual leads of these arrays correspond with the output line 591 shown in FIG. 19. As before, enablement of gates 630 and 631 is provided in part from negative AND gate 662 which is shown receiving strobe and read not inputs, STB3, RDN, from the microprocessor function. The output of gate 662 at line 664 is directed to one input each of NAND gates 666 and 667, while the opposite input to gate 666 is shown receiving the A0 signal, and the opposite input gate 667 is shown receiving an A0N signal.

The output of buffers 630 and 631 are eight line lead arrays as represented by arrow 668 extending from gate 30 to connection with bus 648, while buffer 631 is shown in direct connection with bus 648.

Looking to FIG. 21, one of the two identical latching inputs from the microprocessor phase control bus as at 648 is represented at block 670. The latch 670, which may be, for example, a type 54LS273, provides the SWI or switching input signals to each channel as represented for one channel at 546 in FIG. 19. For the preferred embodiment, 16 such channels are provided and thus two eight lead latches are utilized. The latches as at 670 are enabled from negative NAND gate logic as represented at 672, such gates receiving a strobe, STB, and buffered write, BWR, input signals for such enablement. At the commencement of any polling cycle, the latches 670 are reset from the microprocessor as represented at line 674. The output of latch 670 is shown as an 8 lead array 676 corresponding with the first 8 channels which are controlled.

Another check feature for the isolated electronic switch output involves the monitoring of the output of the latches as at 670 themselves. In this regard, the output of the latches is read and placed in random access memory such that a subsequent comparison can be made between the state of the switch or Darlington coupled transistor pair Q1 as shown in FIG. 19 and that same RAM image of the latch. Looking to FIG. 22, a bus driver or buffer 678, which may be provided, for example, as a type 54LS244 is shown having as its input an 8-lead array 680 which is carrying the same signals as lead array 676 in FIG. 21, i.e. the switching commands SWI00–07. Buffer 678 is enabled from negative NAND gate 682 upon command from the microprocessor including strobe, STB, and read not, RDN. The output of buffer 678 is shown as an 8-lead array 684 which is coupled to data address bus 648. As is apparent, for a 16 channel module, an additional latch as at 678 is provided to accommodate an additional 8 channels.

From the foregoing, it may be observed that a status word can be compiled for each channel of the isolated electronic switch output module representing the status output signals as shown on lines 590, 591 and 608 in FIG. 19 and labelled, respectively, BATT, VOLTG, and LOAD. Additionally, a verification of the output of the switch command latch as at 670 may be provided and a RAM image comparison of the state of the latch and of the state of the switch can be provided. Thus, a switch status byte for each channel may be assembled having the bit positions as follows:

00=load voltage status, i.e. line 591;
01=load current status, i.e. line 608;
02=actual state of control latch, i.e. latch 670;
03=battery voltage status, i.e. line 590;
04=RAM image of the output state.

From the above switch status byte, over 30 possible conditions can be compiled, while some are "illegal" as being impossible, a significant number will provide excellent status and diagnostic information for the system.

MONITORED ANALOG OUTPUT CONTROL

It may be recalled from the discourse in conjunction with FIG. 3 that another of the modules or selectable functions of the process input and output component 28 of control unit 10 is a high level analog output as represented at line 49. This feature provides a controlled output current in the range of 4 to 20 milliamps to drive typical process controlling devices such as valve actuators, meters, strip chart recorders and the like. The lower limit of 4 milliamps is elected as a 0 level inasmuch as it is desired to maintain any such 0 level as an active output. Generally, the load driven is selected as having a minimum impedance of 100 ohms and a maximum impedance of 1,000 ohms. Loads exhibiting an impedance below 100 ohms are considered to be shorted out. The general approach of industry to monitoring these outputs has been somewhat limited to the utilization of meters or the like to determine the presence or absence of a current in the vicinity of the given load. With the instant module, however, there is provided an extensive status evaluation of the control over the output as well as the relationship of the output with the selected load. Of particular merit, the instant analog output module is redundant, a feature wherein two output circuits are tied together such that upon the failure of one, the back-up unit is capable of being switched forthwith into operation of the load without a variation in output current status. In general practice, such redundancy has been severely limited inasmuch as the currents of the redundant devices tend to sum and no effective techniques of correction with the loss of one were provided. As before, the circuits utilized with the instant module are combined with a conventional microprocessor based control of conventional design as described in conjunction with FIG. 5. Additionally, the module is capable of accommodating a plurality of channels, for example, 16 channels leading to 16 various loads.

In the discourse to follow, the analog control circuit used for each channel of the analog output is described, whereupon the features thereof with respect to the provision of redundant outputting are set forth. The description then turns to the interfacing techniques utilized with respect to microprocessor based control for the module and the techniques of determining operational status following which a broad base block diagram of the module is disclosed.

Looking to FIG. 23, the output drive circuit is portrayed in electrical schematic fashion. The level of current desired for outputting to a given load for any channel is elected by the microprocessor based control (control signal input) for the module which may be directed thereto from the primary controller 34 (FIG. 3). This voltage level is provided as a digital signal which is inputted to a digital-to-analog converter to provide an analog value which is, in turn, inputted along line 700 carrying signal, DAC, along with a sequencing election signal CHI at line 702 to a sample and hold circuit 704. The enablement signal at line 702 may be delayed slightly for purposes of permitting the analog input to the circuit 704 to attain a quiescent state, the circuit also advantageously accommodating for spurious signals occasionally encountered in the course of digital-to-analog conversion. Circuit 704 may be provided, for example, as a Harris type 2420 and is coupled to ±15 v as illustrated, as well as to analog ground. The output of the sample and hold circuit 704 is provided at line 708 which incorporates resistor 710 and extends to the winding of a variable resistor or poteniometer 712 located in line 714. Line 714 includes a resistor 716 and extends to analog ground as well as to the negatve input of an error stage of amplifier-comparator 718. Amplifier 718 may be provided, for example, as a type AD517 and the output thereof is directed along line 720, which may swing positive or negative, to a symmetrical, amplified mirror output driver network shown generally at 722 and comprised of transistors Q10–Q13.

Network 722 is coupled to +Vc voltage source at line 724. This voltage source, Vc, is at an enhanced level, for example, in the 20 v–30 v range derived from a voltage enhancement to assure that drive is available for loads at a maximum of 1,000 ohms. Voltage source line 724 is shown coupled through resistor 726 and diode 728 within line 730 to the collector of an NPN transistor Q10. The base of transistor Q10 is coupled with output line 720 of amplifier 718 through line 732 and its emitter is coupled through line 734, line 736, containing resistor 738, to analog ground. Line 734 also is connected to the emitter of PNP transistor Q11, the base of which is additionally coupled to the amplifier output at line 732 and the collector of which is coupled via line 740, diode 742 and resistor 744 to −15 v supply. With this arrangement, and assuming a positive output at line 720, transistor Q10 will be turned on and current will be caused to flow to the base-emitter junction thereof through resistor 738 and line 736 to ground. This activity serves to sink current from PNP transistor Q12 via line 746 coupled between the base thereof and line 730. The emitter of transistor Q12 is coupled by line 748 through resistor 750 to source line 724, while the collector thereof is coupled via line 752 and resistor 754 to output line 756 which extends to a terminal designated A upon a terminal block 758. Resistors 726 and 750 are selected such that, for example, resistor 726 has a resistance value of 330 ohms, while resistor 750 has a resistance value of 33 ohms. Thus, if one milliamp of current is present at the collector of transistor Q10, approximately 0.33 volts will be generated across resistor 726. That creates a voltage at the base of transistor Q12 of 0.33 volts plus the value of a diode drop. Such diode drop is substracted through the base emitter junction of transistor Q12 such that the 0.33 volts generated across resistor 726 appears across the 33 ohm resistor 750 to derive 10 milliamps of current directed to resistor 754 which may, for example, have a resistance value of 180 ohms. In effect, about 1 milliamp of current directed through transistor Q10 will cause a 10 milliamp output at line 756. Resistor 738 may, for example, have a resistance value of 1,000 ohms and one volt provides the generation of one milliampere of current at that position. Thus, a volt plus an approximate half volt base emitter drop derived at line 720 will be reflected as a 10 milliamp current at the output line 756. This arrangement is generally referred to as an amplifier mirror circuit structure.

Network 722 is symmetrical such that if the voltage signal at line 720 is negative with respect to ground it will function to sink curent instead of source it. Looking to the opposite side of the network 722, it may be observed that line 740 at the collector of transistor Q11 is connected via line 760 to the base of NPN transistor Q13. The emitter of the transistor Q13 is coupled through resistor 762 to line 740 and −15 v, while the collector thereof is coupled through resistor 764 to output line 756. Resistors 744, 762, and 764 have the same resistance values as respective resistors 726, 750, and 754. Accordingly, in the presence of a positive voltage level at lines 720 and 732, transistors Q11 and Q13 will be off. Conversely in the presence of a negative signal at line 720, transistors Q10 and Q12 are off. In the presence of a negative signal at line 720, the operation of transistors Q11 and Q13 is substantially identical in terms of results as the operation of transistors Q10 and Q12.

The development of negative going voltage levels from amplifier stage 718 at line 720 is derived from a feedback loop which extends from the opposite side of the load to which terminal A is connected, this opposite connection with the load being provided at terminal B of terminal block 758. Note that this terminal connection B is coupled into the instant circuit via line 766 which extends through diodes D1 and D2 to a virtual ground constituted at the negative input of a ground stage stable amplifier 768, provided, for example as a type OP27F. The positive input to amplifier 768 is coupled to analog ground via line 770, while the output thereof at line 772 is coupled to the base of PNP transistor Q14. The collector of transistor Q14 is coupled through resistor 774 to −15 v, while the emitter thereof is coupled via line 776 including resistor 778 to the positive input of amplifier 718.

Amplifier 768 functions to match the voltages at its inputs, its positive input being at ground. It may be noted that line 766 at the input of amplifier 768 is coupled via line 780 and lines 782 through resistor 784 to line 776 and the noted emitter of transistor Q14. Thus, in developing a virtual ground, the amplifier will turn on transistor Q14 and divert current through resistor 784 and line 776 to −15 v through resistor 774, i.e. transistor Q14 sinks the current from the load through resistor 784. There results a voltage at line 776 corresponding with the current returning from the load which is applied from line 776 to amplifiction stage 718. Stage 718 thus serves the function of an error amplifier. A resistor 786 is shown connected between line 776 and analog ground. This inverted voltage signal at line 776 is tapped at line 788 to provide a feedback signal designated FB for use in the status monitoring circuitry of the analog output module.

Figure 24:
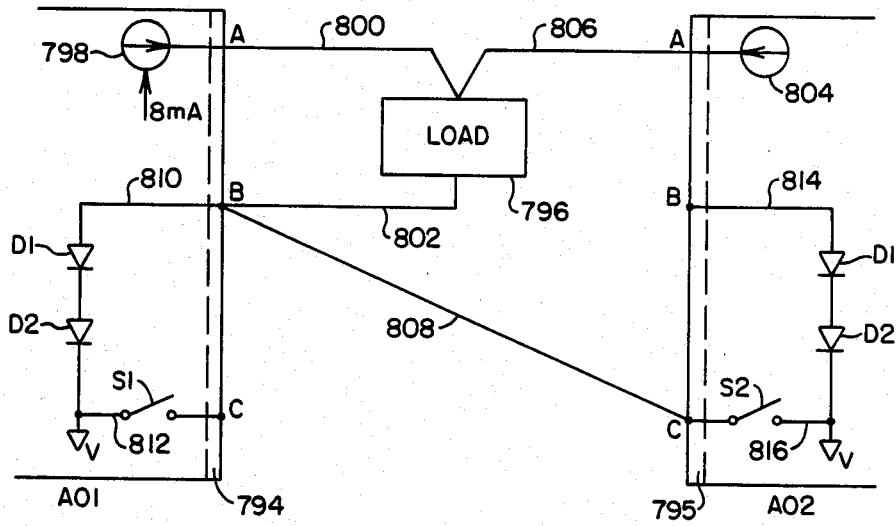
FIG. 24 is a schematic representation of a redundant utilization of the circuit of FIG. 23.

With the above-disclosed current output features of the instant circuit in mind, reference is additionally made to FIG. 24 where the utilization of two such circuits in a redundant load drive configuration is portrayed. In FIG. 24, two such circuits are depicted represented as AO1 and AO2 along with respective terminal blocks 794 and 795. The above-noted terminal connections A, B and C are reproduced for each of the circuits AO1 and AO2 and the load to be driven is represented by a block 796. Circuit AO1 is considered to be the primary circuit, circuit AO2 being a back-up circut which is activated under control of the operator or automatically by the primary controller 34 as shown in FIG. 3 or from a remote host computer. Accordingly, control current generation is provided from circuit AO1 as is represented by the generator 798 providing current at terminal A for distribution to load 796 via line 800. The return from load 796 is shown being provided from line 802 and is connected to terminal B which corresponds to line 766 in FIG. 23. To tie together circuits AO1 and AO2, a redundant coupling is provided. In this regard, terminal A of circuit AO2 representing a potential current output from current generator 804 is coupled by line 806 in common with line 800 to the input of load 796. Terminal C of circuit AO2 is coupled via line 808 to terminal B of circuit AO1. It may be noted that both circuits AO1 and AO2 are identical. In this regard, note that a line 810 extends from terminal B in circuit AO1 through diodes D1 and D2 to virtual ground and that a line 812 containing a solid-state switch S1 is coupled between line 810 intermediate diode D2 and virtual ground to terminal C. In similar fashion, terminal B of circuit AO2 is coupled via line 814 through diodes D1 and D2 to virtual ground and a line 816 containing a switch S2 is coupled from terminal C to line 814 between diode D2 and virtual ground.

Upon the occurrence of a failure of circuit AO1, solid-state switch S2 is closed and the return from load 796 then immediately diverts from terminal B of circuit AO1 via line 808 to terminal C of circuit AO2 and virtual ground. This diversion is immediate inasmuch as the current at line 802 sees a high resistance path through diodes D1 and D2 and the bias necessary for diodes D1 and D2 to conduct has been collapsed toward virtual ground at terminal C of circuit AO2. Circuit AO1 reacts substantially simultaneously to the diversion of the current to clamp and assert a predetermined current output from generator 798, for example, 8 milliamps. Circuit AO2 then powers the load 796 and the feedback feature thereof permits continuation of a controlled current input thereto. As the current is diverted from circuit AO1 the error stage as at 718 thereof will attempt to drive the current source network 798 to full value in an attempt to bring output current to a desired level. Since this would be undesirable in the redundant configuration of these circuits, the clamped current serves to limit this error stage activity.

Returning to FIG. 23, the implementation of this transfer feature is revealed. Assuming the the occurrence of a fault condition wherein the monitoring functions of the circuit indicate a switch-over from circuit AO1 to AO2 is appropriate, circuit AO1 will be shut down by virtue of the termination of current flow into terminal B and line 766. As noted above, any current asserted at terminal B will confront the high resistance path of diodes D1 and D2 as the voltage across them is forced toward virtual ground at terminal C of circuit AO2 and will be diverted accordingly. Line 766 leading to virtual ground in circuit AO1 will carry no current and no voltage will be generated across resistor 784.

Amplifier 768 will tend towards its positive side at 0 volts thereby turning off transistor Q14. Adjacent transistor Q14 there is positioned an NPN transistor Q15 having its emitter coupled to line 772, its base coupled to line 776 and its collector coupled via line 818 through resistors 820 and 822 to source line 724. A line 824 is coupled to line 818 intermediate resistors 820 and 822 and to the gate terminal of a field effect transistor (FET) 826. Transistor Q15 is on when transistor Q14 is on, however, under the instant situation, transistor Q15 is turned off with transistor Q14 because of the termination of return current. In consequence, the gate electrode of FET 826 is pulled up and the device is turned on. The drain electrode of FET 826 is coupled through resistor 828 to source line 724 and the source terminal thereof is coupled to line 746 leading to the base of transistor Q12. Thus, when FET 826 is turned on, resistor 828 is coupled directly to the base of resistor Q12 thereby limiting the current asserted thereto to a fixed value, for example, 8 milliamps. Resistor 828 may have a resistance value, for example, of 82 ohms to achieve this.

By so clamping the output of the by-passed drive circuit to the somewhat arbitrary current output of 8 milliamps, a provision is made for returning the primary circuit, i.e. AO1 (FIG. 24) into operation. At such time as the primary circuit is re-activated, the clamped current flow will assure a feedback flow from line 776 to error amplifier 718, thus preventing it from reacting extravagently to a zero feedback value.

Now assuming the circuit of FIG. 23 to be operating as a back-up circuit AO2, the microprocessor based control will assert a signal providing for the equivalent of closing switch S2 as described in FIG. 24. This signal, identified as BKPSTB or back-up strobe, is asserted at line 830 and the switch corresponding with switch S2 is shown as a high powered VMOS transistor 833 which may, for example, be provided as a type 2N6660. In order to provide a failsafe actuation of the switch, the signal asserted at line 830 is provided in continuously pulsed fashion. Line 830 is seen to be directed to base resistor 834 and to the base of an NPN transistor Q16. The emitter of transistor Q16 is coupled to ground, while the collector thereof is coupled through resistor 836 to +15 v. This collector also is coupled via line 838 and a.c. coupling capacitor 840 to a charge pump circuit represented generally at 842. Circuit 842 includes a diode 844 and resistor 846 coupled in parallel between line 838 and ground, as well as a diode 848 within line 838 and parallel coupled capacitor 850 and resistor 852. With the arrangement shown, as a continuously pulsed signal is provided at line 830, transistor Q16 is turned on and off in correspondence therewith to impose the same alternating signal at line 838 which is coupled through capacitor 840 to network 842. The pulse input continuously charges capacitor 850 which remains in discharge relationship with resistor 852. Thus, as long as the signal at line 830 is maintained, the transistor 832 will remain in an on or conducting state. The capacitive coupling at 840 eliminates any solid-state signal form of fault at line 830 causing the gating on of transistor 832. A Zenner diode 854 coupled between lines 782 and ground provides surge protection for the transistor 832. As is apparent, with the turning on of transistor 833, line 782 leading to terminal C is coupled directly to the virtual ground negative input terminal of amplifier 768 to cause the circuit to operate in conjunction with error amplifier 718 as described above. Further surge protection is provided by a low voltage varistor 856 which is coupled along with resistor 858 between line 766 and ground. Resistor 858 is provided to increase the path resistance through diodes D1 and D2 when no return current is present as in the case of circuit AO2 taking over operation.

Now looking to the monitoring and fault detection features associated with the circuit of FIG. 23, it is desirable to detect any short in the load or actuator being driven. To detect such a short, the circuit is capable of detecting the 100 ohm minimum impedance assigned for such loads. In one aspect, this is carried out by evaluating the precise amount of voltage generated across the load with respect to terminal B or C depending upon the circuit configuration. It may be recalled that respective lines 766 and 782, are activated in the alternative depending upon the primary or back-up status of the output drive circuit. To make this evaluation of the output voltage, a resistor network including resistors 860 and 862 is coupled between lines 756 and analog ground. These resistors are tapped at their common junction by a line 864 which is shown carrying the signal voltage out or V0. This voltage will be directly proportioned to the signal generated at network 722 output line 756 and is arranged such that it is 0 with respect to the return terminal B or C for a short circuit condition. The network of resistors deriving the V0 output serves to essentially eliminate calculation in software to preserve microprocessing time. A Zenner diode 866 is shown coupled between lines 756 and ground for the purpose of surge protection.

The output drive circuit also monitors the voltage at the opposite side of the load at line 868 which extends through resistor 870 to line 728 at terminal C and through resistor 872 to line 766 at terminal B. With this arrangement, the difference between V0, the signal at line 864 at the "top" of the load and the signal RTN at line 868 representing the opposite side of the load will provide an indication of voltage across the load.

Figure 25:
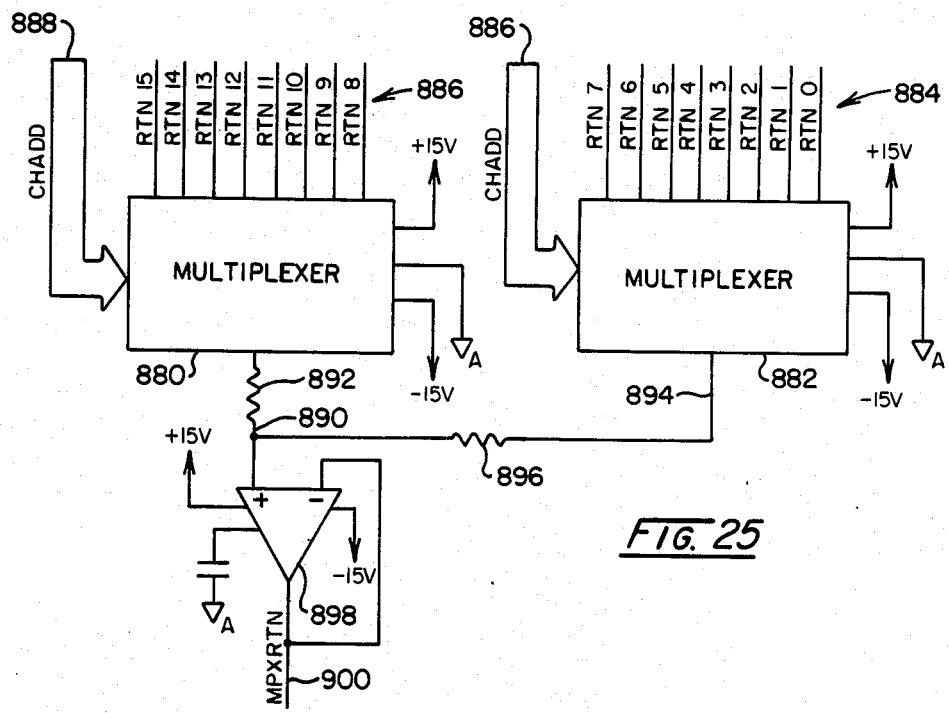
FIG. 25 is an electrical schematic diagram showing a multiplexing arrangement.

To somewhat simplify the multi-channel operation of the output drive circuit, the instant module provides a sequencing logic circuit as part of its hardware. This sequencing logic is used to provide a predetermined sequence of outputting of digital-to-analog signals to the sample and hold circuits such as at 704 as well as to provide status inputting and digital outputting to the digital-to-analog converter from an on-board 16×16 random access memory (RAM). The status multiplexers, in particular, are utilized to sequence the outputting of the noted signals FB, VO, and RTN as described at respective lines 788, 864 and 868 in FIG. 23. Looking to FIG. 25, the dual multiplexers utilized for collecting the return (RTN) data are revealed at 880 and 882. These multiplexers may be provided, for example, as type HI508 and it may be observed that the input to multiplexer 882 is arranged to receive lead array 884 which presents eight channels of return data, i.e. RTN0-7. The multiplexer 882 is driven by the noted sequencing logic at its A0-A3 and enable ports as represented by the arrow 886. In similar fashion, multiplexer 880 receives eight channels of return status data as represented at lead array input 886 and additionally receives sequencing data at the earlier-noted input port designations from the sequencing function as represented by arrow 888. Note that the signals represented from the sequencer at arrows 886 and 888 are provided by the signal designation CHADD. The output of multiplexer 880 is provided at line 890 through resistor 892, while the corresponding output of multiplexer 882 is provided at line 894 which contains an identical resistor 896 and is coupled to line 890. Line 890, in turn, is directed to a buffer 898 which may be provided, for example, as a type LM208 and the buffered output therefrom is provided at line 900 as a multiplexed return carrying the signal MPXRTN.

Figure 26:
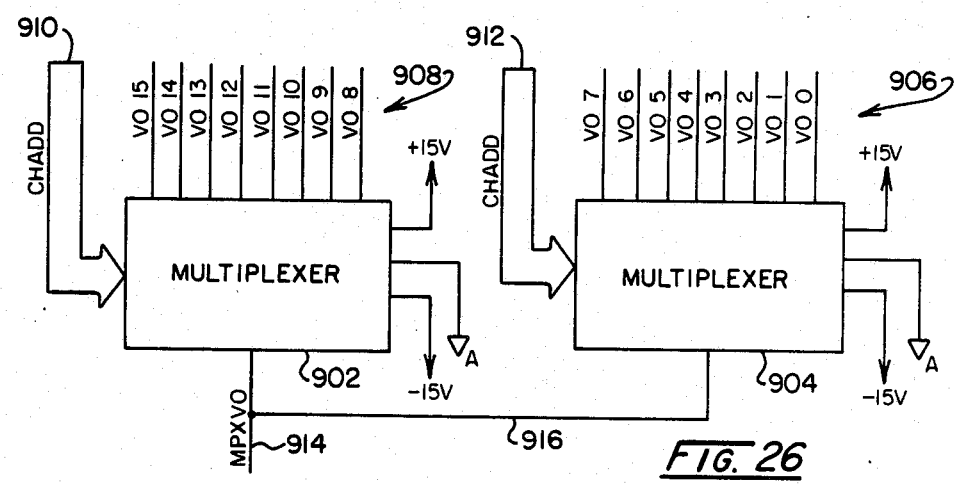
FIG. 26 is an electrical schematic diagram showing a multiplexing arrangement.

Looking to FIG. 26, a similar arrangement is provided for multiplexing the output voltage carrying the signal VO as described in conjunction with line 864 in FIG. 23. The figure shows that two multiplexers, 902 and 904 are utilized and these multiplexers may be the above-noted type HR508. Multiplexer 904 is shown receiving eight channels of output voltage status signals, V00–07 at lead array 906. Similarly, multiplexer 902 receives eight channels of output voltage signals V08–V015 at lead array 908. The A0–A3 and VN input terminals to multiplexers 906 and 908 are actuated from the noted sequencing function as represented by respective arrows 910 and 912. As before, the sequencing input is identified by the signal designation CHADD. The output of multiplexer 902 is provided at line 914 while the corresponding output of multiplexer 904 is provided at line 916, the latter line being coupled to line 914. As labelled on the drawing, the multiplexed voltage out signal is provided having the designation MPXVO.

Figure 27:
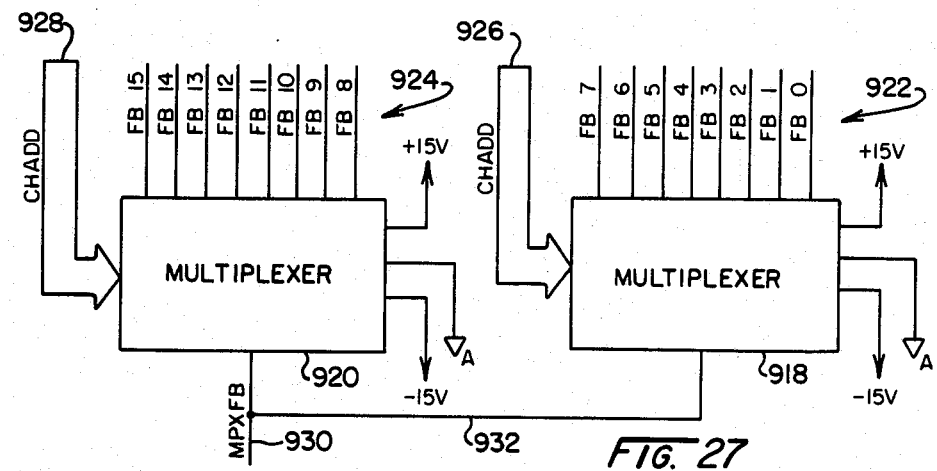
FIG. 27 is an electrical schematic showing a multiplexing arrangement.

Looking to FIG. 27, the multiplexing arrangement for the feedback signal, FB, as described in conjunction with line 788 in FIG. 23 is portrayed. As before, two multiplexers are provided as at 918 and 920 which may, for example, be type HI508. Multiplexer 908 receives a feedback signal from an 8-line lead array represented at 922 and shown carrying the signal designations FB0–FB7. Similarly, multiplexer 920 receives eight channels of feedback information as designated FB8–FB15 from lead array 924. The sequencing logic provides for the sequential actuation of the multiplexers and is represented as inputting to the A0–A3 and enable, EN, terminals thereof by arrow 926 in the case of multiplexer 918 and arrow 928 in the case of multiplexer 920. As before, these arrows are labelled as carrying the signal designation CHADD. The output of multiplexer 920 is provided at line 930, while the corresponding output of multiplexer 918 is provided at line 932 which is coupled to line 930. Line 930 is shown carrying the multiplexed feedback signal output now designated MPXFB.

Figure 28:
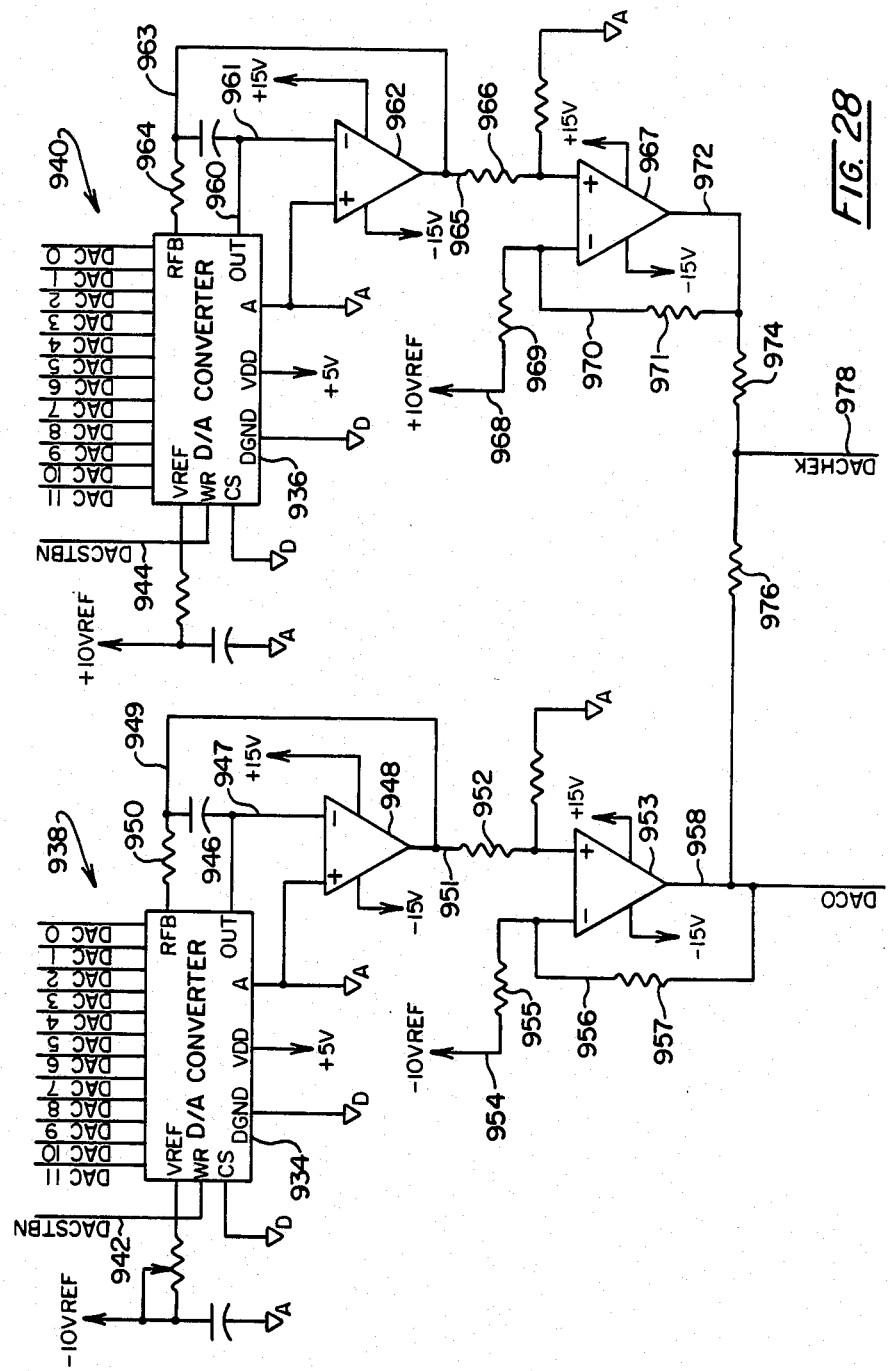
FIG. 28 is an electrical schematic diagram showing a redundant digital-to-analog converter circuit.

Looking to FIG. 28, the digital-to-analog converters which provide the DAC inputs to the sample and hold circuits as at 704 in FIG. 23 are revealed. Two identical digital-to-analog devices are utilized as are revealed at 934 and 936. These converters, which may, for example, be type AD7545GCQ simultaneously receive digital values corresponding to the analog input intended for the sample and hold circuits from respective lead arrays 938 and 940. It may be observed that each of these lead arrays 938 and 940 carry the signals DAC0–DAC11, a 12-bit number representing desired current value which is derived from the earlier-noted random access memory (RAM), such numbers being off-loaded from the microprocessor based control to the RAM memory. Note that converter 934 is provided a minus 10 volt reference input at its VREF terminal, while converter 936 is provided an equal but opposite polarity 10 volt reference input at its VREF terminal. Thus, the outputs of the converters will be of opposite polarity. A write command is provided to the WR terminals of converters 934 and 936 from respective lines 942 and 944 which are shown carrying the digital-to-analog converter strobe signal DACSTBN. The output of converter 934 is provided at lines 946 and 947, the latter of which is directed to the input of an amplfaction stage 948. The RFB terminal of the converter 938 is coupled to line 949 carrying resistor 950 and is directed to the output line 951 of amplifier 948. This arrangement converts the output to an initially desired voltage range. Line 951 extends through resistor 952 to the positive input of another amplifier 953. The opposite or negative terminal input to amplifier 953 receives a reference voltage from line 954 containing resistor 955. Line 954 further is coupled by a line 956 containing resistor 957 to the output of amplifier 953 at line 958. The thus-treated and buffered analog output is shown carrying the signal designation DACO. Amplifiers 948 and 953 may be provided, for example, as type 0P27F.

The outputs of converter 936 are treated identically, and in this regard, components 960–971 will be seen to be identical and perform identically with respective components 946–957, except that they derive their outputs from identical voltage value references of different polarities. Thus, their output signals manifested at lines 958 and 972 are equal but of opposite polarity and, under normal operation, should sum through resistors 976 and 974 and at line 978 to exactly zero volts. Output line 972 extends to line 958 but incorporates two resistors 974 and 976 intermediate which an analog readout is provided by connection of line 978 with line 972. In this regard, line 978 carries the signal designated DACHEK which value is used to check the performance of converter 934 and should always be zero under normal conditions.

Figure 29:
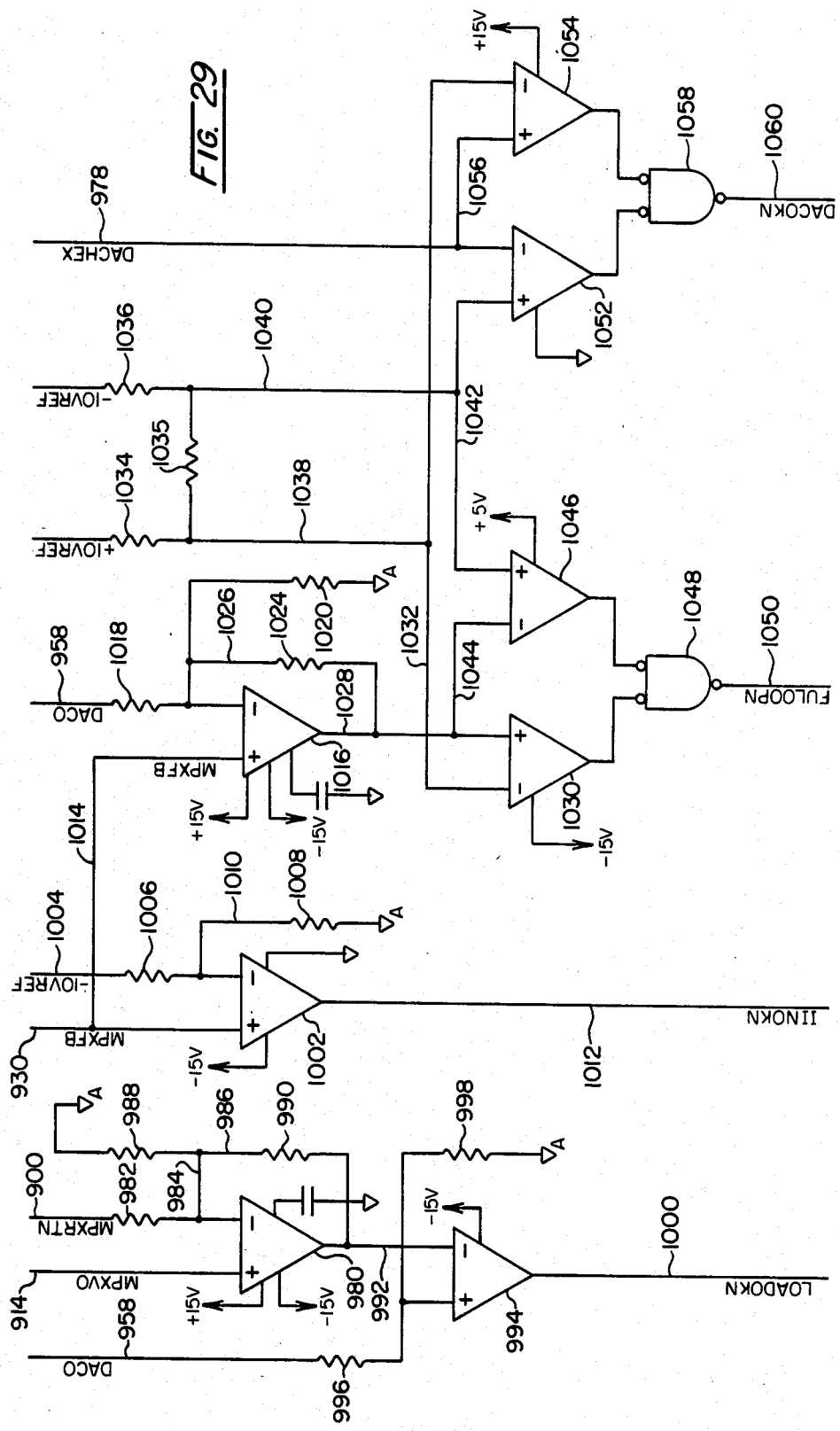
FIG. 29 is an electrical schematic diagram showing a status signal derivation circuit.

As indicated earlier herein, the instant output drive circuit is structured to provide outputs to load impedances varying from 100 to 1,000 ohms. The status of this output system as well as the load is checked for each of the 16 channels utilizing the noted multiplexed signals MPXVO, MPXRTN, MPXFB, DACHEK and the initial analog output of the digital-to-analog converter DACO. Referring the FIG. 29, the multiplexed output voltage signal at line 914 and the multiplexed return signal at line 900 are shown being introduced with the same line designations to the respective positive and negative inputs of an amplifier 980 which may be provided, for example, as a type LM208. Note that line 900 incorporates a resistor 982 and is connected by a diverting line 984 to line 986 incorporating resistors 988 and 990 and which is coupled to the output of amplifier 980 at line 992. With this configuration, the signal at line 992 represents the difference between the output voltage and return voltage values asserted at lines 900 and 914 and is in correspondence with the effective voltage across the load. If, for example, that effective voltage is less than the voltage corresponding with a 100 ohm minimum impedance for the load, then a fault condition is at hand. Line 992 is shown directed to the negative input terminal of a precision comparator 994 which may be provided, for example, as a type HA4900. The opposite or positive terminal input to comparator 994 is derived from 958, the output of analog-to-digital converter 934 as represented by the signal designation DACO. This signal is directed through resistor 996 to the noted positive terminal and the line further is directed through resistor 998 to analog ground. This circuit, thus configured, produces a voltage equal to the minimum voltage that a 100 ohm load would produce as a result of the output current which is in proportion to the level of the signal DACO. If the effective voltage across the load signal at line 992 is not greater than the value of the voltage at line 958, then it will be known that the minimum 100 ohms impedance is not experienced across the load. The output of comparator 994 is shown at line 1,000 and is identified having the signal designation LOADOKN and provides such load status information in dependence upon the logic level thereof, a logic high representing that the load status is not okay.

The multiplexed feedback signal is shown at line 930 being directed to the positive input terminal of another precision comparator 1002 which may be provided, for example, as a type HH4900. Recall that the feedback signal is the same as the input to the error amplifier 718 (FIG. 23) and is directly proportional to the current that is coming back from the load. Thus, if the minimum 4 milliamps is passing through the load, the feedback voltage will have directly corresponding value in the presence of proper operation. This feedback signal is compared with −10 v reference signal at line 1004 which is adjusted by a voltage divider comprised of resistor 1006 and resistor 1008 coupled within line 1010 between analog ground and line 1004. Under conditions where the feedback signal at line 930 is above the threshold established by the input at line 1004, the current at the feedback position is below the noted 4 milliamp minimum current flow and, therefore, represents an illegal state, it being recalled that the feedback signal is a negative one. The output of comparator 1002 is provided at line 1012 and provides a logic high in the presence of such an illegal condition and carries the signal designation IINOKN.

The same multiplex feedback signal is directed from line 930 via line 1014 to the positive input terminal of an amplifier 1016 which may be provided, for example, as a type LM208. Line 958, carrying the output signal of the digital-to-analog converter 902 and designated DACO, is directed through resistor 1018 to the negative input of the amplifier. As before, some level adjusting is provided by resistor 1020 in line 1022 as well as resistor 1024 within line 1026. Inasmuch as one of the inputs to amplifier 1016 is inverted, a summing occurs such that where the feedback signal which is returning from the load is equal to the generated output voltage asserted at the sample and hold circuit as at 704 in FIG. 23, then the value of the signal at the output of amplifier 1016 at line 1028 should be 0. To determine if this is the case, line 1028 is directed to the positive input terminal of a precision comparator 1030 which may, for example, be present as a type HA4900. The opposite input to comparator 1030 from line 1032 carries a signal for evaluating whether the voltage level at line 1028 falls within the percentage tolerance limits found acceptable. The signal at line 1032 is determined by a precision resistor network comprised of resistors 1034–1036. It may be observed that resistor 1034 is connected within line 1038 leading between a +10 v reference and line 1032, while resistor 1036 is positioned within line 1040 extending, in turn, between a −10 v reference and line 1042. The signal at line 1028, representing the output of amplifier 1016 additionally is directed by line 1044 to another precision comparator 1046 while an opposite polarity reference signal is directed thereto from line 1042. Thus, the outputs of comparators 1030 and 1046 present a dual threshold or window form of comparison to the signal at line 1028 to determine its acceptability. The output of comparators 1030 and 1046 are directed to inputs of a negative NAND gate 1048 which asserts an output at line 1050 indicating whether or not the signal at line 1044 is valid which is designated FULOOPN. This signal essentially constitutes a full loop status evaluation. To derive a logic low output at line 1050, gate 1048 requires low signals at each input.

To evaluate the validity of the output of digital-to-analog converter 934, substantially the same window comparison is carried out with respect to the DACHEK output of the redudant digital-to-analog converter 936. Recall that that converter receives the same digital value input as converter 934. Accordingly, two precision comparators, 1052 and 1054 are provided, the respective negative and positive terminals thereof receiving the DACHEK input from lines 978 and 1056. The reference inputs to comparators 1052 and 1054 are derived from respective line 1042 and 1032. As before, the outputs of the comparators are directed to a negative NAND gate 1058 which provides an output of status evaluation at line 1060. Note that this line is labelled DACOKN and provides a logic high in the presence of a fault status.

From the foregoing it may be seen that the status checks carried out thus far look to whether the load valuation is within minimum load requirements, i.e. 100 ohms. A full loop check extending from the output of the digital-to-analog converter through the load and back through to the feedback signal determines whether the current returned is in correspondence with what is desired to be put out and, finally, a determination has been made that the digital-to-analog converter is working properly. These data are returned to the noted random access memory remaining four memory positions of the 16 available and thus, may be utilized by the microprocessor based control for a variety of purposes. This same control is capable of determining whether or not the load is exhibiting greater than 1,000 ohms resistance such that it would be out of the compliance range of the module. Generally speaking, where such an occurrence is at hand, the output of the system will totally saturate and the IINOKN signal at line 1012 as well as the FULOOPN signal at line 1050 will indicate a fault.

Figure 30:
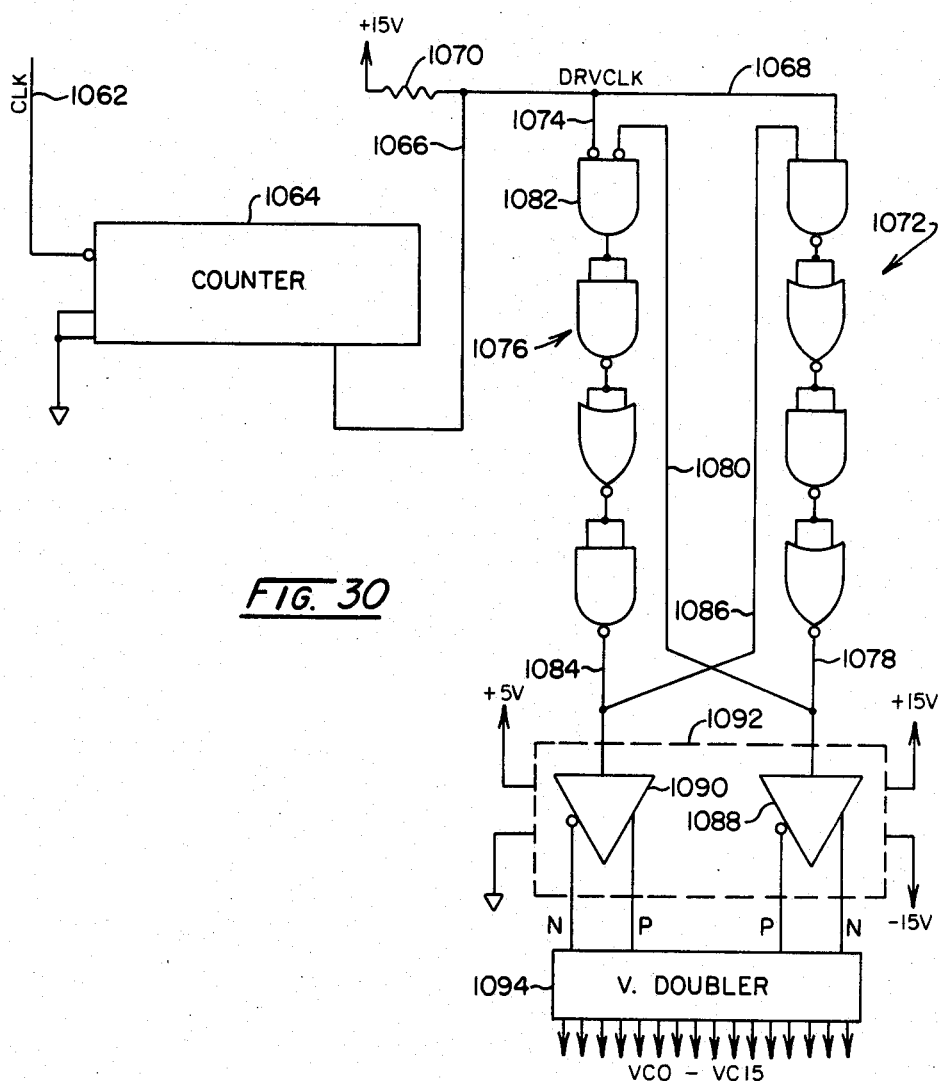
FIG. 30 is an electrical schematic diagram showing a voltage deriving circuit.
Figure 31:
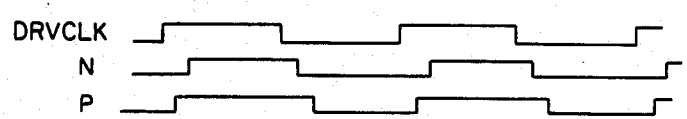
FIG. 31 is a timing diagram for components of FIG. 30.

It may be recalled that a higher positive voltage is necessitated for the current drive network 722 as described in connection with FIG. 23 and that higher voltage source at line 724 was designated VC. Referring to FIG. 30, the technique for deriving the higher level voltage required for driving maximum loads of 1,000 ohms is revealed. In the figure, the clock output (CLK) from the microprocessor of the microprocessor based control is asserted from along line 1062 to the clock input of a counter 1064. Counter 1064 may, for example, be provided as a type 54LS393 and divides the clock input at line 1062 to provide a lower frequency clock output at line 1066. Line 1066 extends to line 1068 which leads to a pull-up resistor 1070 to +5 v and to one input of a gate chain represented generally at 1072. The DRVCLK signal at line 1068 also is directed from line 1074 to a corresponding gate chain shown generally at 1076. Gate chain 1072 is formed of an alternating sequence of NAND and NOR gates to provide an output at line 1078. This output also is directed via line 1080 to the input of gate chain 1076. Gate chain 1076 is made up of negative AND gate 1082, the output of which is directed to a chain of gates provided as a sequence of NAND, NOR and NAND gates to provide an output at line 1084. This output is directed via line 1086 to one input of gate chain 1072. Output line 1078 and 1084 are directed to the respective driver components 1088 and 1090 of a level shifter and voltage doubler driver represented within the dashed boundary 1092 which may be provided, for example, as a type D169AP. Gate chain 1072 and 1076 provide a set of offset signals in response to the DRVCLK input signal to turn the voltage doubler drivers 1088 and 1090 on in a sequence preventing output stages from being destroyed. The outputs of stages 1088 and 1090 are labelled, respectively, P and N and are shown directed to a conventional voltage doubler circuit represented by block 1094. These N, P outputs provide a dead band overlap which is illustrated by the timing diagram of FIG. 31 showing the N and P outputs in timed alignment with the input drive DRVCLK signal at line 1068. The output of the conventional doubler circuit 1094 is directed to each of the 16 channel designated output drive circuits as shown at FIG. 23 for the noted purpose.

Figure 32:
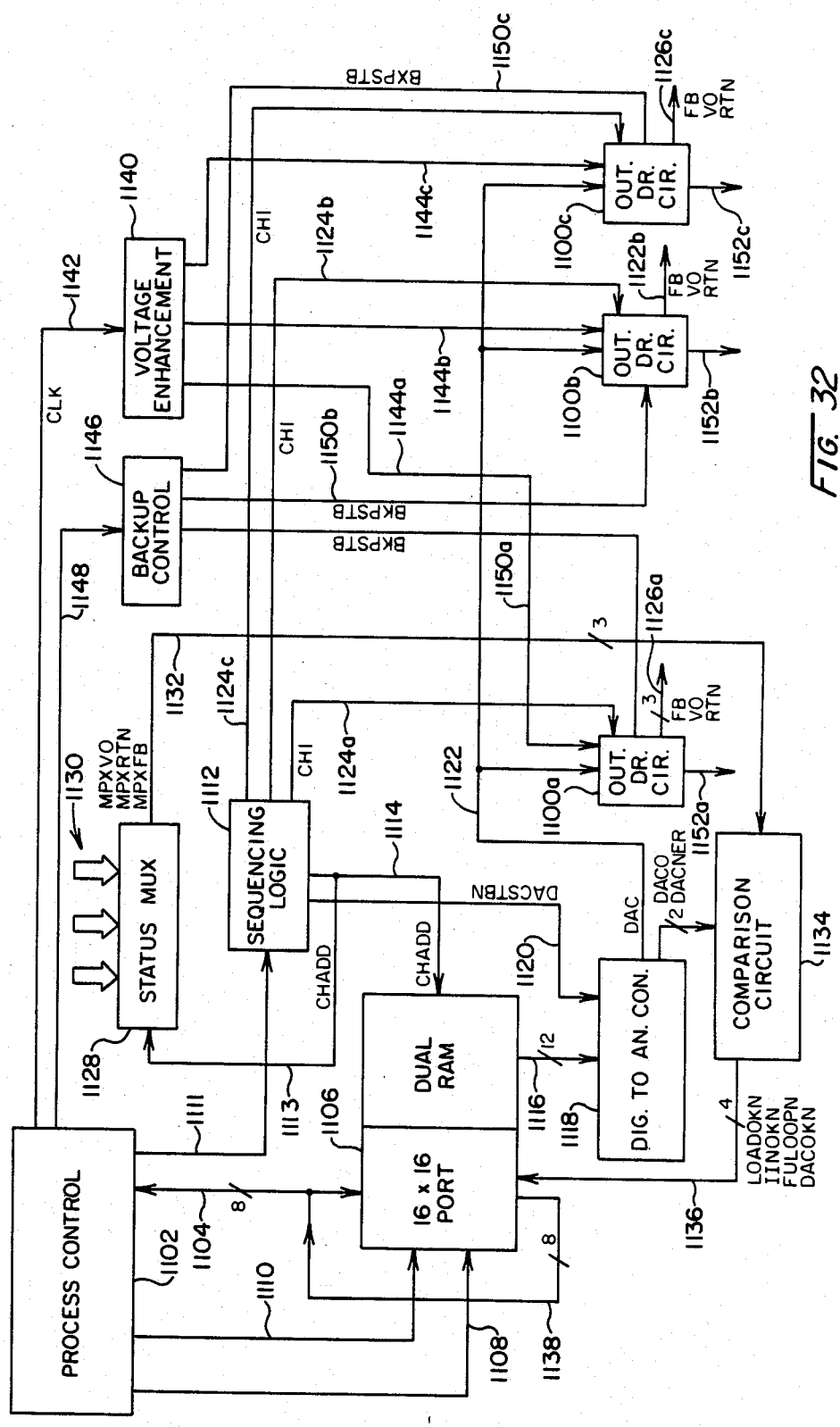
FIG. 32 is a block diagram of the analog output drive system of the invention.

Referring to FIG. 32, the analog output module is represented in black schematic form. In the drawing, the individual output drive circuits or interface circuits for each of the 16 channels are partially shown, for example, as blocks 1100a–1100c. The inputs to these circuits 1100a–1100c for each channel initially are developed from the microprocessor based process control as represented in the drawing at block 1102. Process control 1102 provides parallel data input from along data bus 1104 to a 16×16 dual port random access memory (RAM) 1106. The appropriate address inputs for this insertion or retrieval of data from RAM 1106 are provided from address lines 1108 along with significant bit identification at input line 1110 which provides for utilization of the 16×16 format of RAM 1106. RAM 1106 responds to a sequencing logic signals from the sequencing logic function represented at block 1112 and input line 1114 labelled CHADD to provide a sequence of digital outputs at 12-line bus array 1116 to the digital-to-analog function shown at block 1118 and described herein in conjunction with FIG. 28. Synchronizing control from process control 1102 to sequencing function 1112 is provided from line 1111. Converter 1118 additionally responds to the output of sequencing logic function 1112 at line 1120 labelled as carrying DACSTBN to provide outputs to output drive circuits 1100a–1100c from along line 1122 and the extensions therefrom. It may be recalled that these signals are asserted to the inputs of the sample and hold circuits as represented at line 700 in FIG. 23. Each of the circuits 1100a–1100c also receives a sequencing logic input as represented by lines 1124a–1124c extending from logic block 1112. The circuits 1100a–1100c, in turn, provide a three line output as represented at respective lines 1126a–1126c which carry the earlier-described signals identified as FB, VO, and RTN. These signals from all 16 channels are directed to the inputs of status multiplexers as described in FIGS. 25–27 hereof and represented at block 1128, the noted inputs thereto being represented by the arrow array 1130. Status multiplexer function 1128 is activated for outputting information to the sixteen channels from sequencing logic function 1112 through line 1113 carrying the signal designation CHADD. The signals thus imposed at lead arrays 1130 for treatment at multiplexing function 1128 are outputted as signals MPXVO, MPXRTN and MPXFB at three-line array 1132 which is directed to the comparison circuit described in conjunction with FIG. 29 and shown in the instant drawing at 1134. Circuit 1134 provides the status signals LOADOKN, IINOKN, FULOOPN and DACOKN along four line output 1136 which is directed to RAM 1106. It may be recalled that of the 16-bit availability of the RAM 1106, only 12 bits are utilized for driving the digital-to-analog converter 1118. Accordingly, the remaining available four bits as presented from line 1136 provide for the utilization of the remaining four positions. RAM 1106 retained data may be accessed from process control 1102, the output thereof as represented by additional bus 1138.

As described in conjunction with FIGS. 30 and 31, the instant module also provides a voltage enhancement for effecting the driving of loads up to 1,000 ohms. This function is represented at block 1140 which receives a clock control, CLK, from process control 1102 as represented by line 1142. The output from the voltage doubling circuits of function 1140 are provided at lines 1144a–1144c which are directed to respective output drive circuits 1100a–1100c. In similar fashion, the process control 1102 provides a control to a back-up control function represented by block 1146 from along line 1148. The back-up control provides the requisited pulsed input signal, BKPSTB, for carrying out switch-over from the primary to back-up output drive circuits as represented by lines 1150a–1150c. Finally, the outputs from output drive circuits 1100a–1100c are shown at respective lines 1152a–1152c.

Since certain changes may be made in the above-described system and apparatus without departing from the scope of the invention herein, it is intended that all matter contained in the description thereof or shown in the accompanying drawings shall be interpreted as illustrative and not in a limiting sense.

What is claimed is:

1. An improved monitoring and control system for use with an industrial system where a process is carried out within a production environmental zone with the utilization of switching monitors and actuators with energizable loads coupled by a multiplicity of field wires to a control station, comprising:

an environmentally secure housing positionable within said zone;

switching input process interface means substantially positioned within said housing, including switch interface means connectable by field wiring with said switching monitors for deriving data signals and for evaluating the performance of said switching monitors and associated said field wiring to derive switching input status signals representing said data signals and said performance, and further including switching input process control means for controlling said switch interface means with respect to each said select switching monitor and receiving said status signals; and controller means positioned within said housing and including communications processor means in interactive data transfer communication with said switching input process control means, controller memory means, controller central processing means for evaluating said switching input status signals received by said communications processor means and deriving corresponding process data output signals and for selectively controlling said switching input process control means.

2. The monitoring and control system of claim 1 in which:

said switch interface means comprises:

terminal means connectable with first and second said field wires extending to a said switching monitor;

means for applying a predetermined potential of first polarity to said first field wire and predetermined potential of second polarity to said second field wire;

bias response means coupled with said two field wires and said switching monitor in the vicinity of said switching monitor and deriving said data signals as a first analog voltage signal corresponding with said first field wire and a second analog voltage signal corresponding with said second field wire;

comparator means responsive to said first and second analog voltage signals and to predetermined threshold signals for deriving said switching input status signals;

threshold means actuable for generating said predetermined threshold signals; and said switching input process control means selectively actuates said threshold means.

3. The monitoring and control system of claim 2 in which said bias responsive means includes an impedance network providing a first select impedance in parallel electrical connection with said select switching monitor and a second select impedance in series with said select switching monitor and said first field wire.

4. The monitoring and control system of claim 2 in which:

said threshold means comprises a digital-to-analog converter actuable to derive a said threshold signal as an analog voltage in response to an applied predetermined digital signal input; and said switching input process control means selectively applies said predetermined digital signal input.

5. The monitoring and control system of claim 2 in which: said switching input process control means selectively actuates said threshold means to derive a fault categorized said switching input status signal from said comparator means representing the presence of any detectable fault condition of said switching monitor and first and second field wires, and subsequently actuates said threshold means in the presence of a fault categorized one of said switching input status signals to provide a predetermined sequence of said threshold signals to derive evaluation characterized said switching input status signals from said comparator means.

6. The monitoring and control system of claim 2 in which:

said bias response means includes an impedance network providing a first select impedance in parallel electrical connection with said select switching monitor and a second select impedance in series with said select switching monitor and said first field wire;

said threshold means comprises a digital-to-analog converter deriving a said threshold signal as an analog voltage in response to actuation by an applied predetermined digital signal input; and said switching input process control means selectively applies said predetermined digital signal input.

7. The monitoring and control system of claim 6 in which said switching input process control means actuates said threshold means by application of a predetermined sequence of said digital signal inputs to said digital-to-analog converter, each such signal input representing a predetermined state of said switching monitor and associated said two field wires.

8. The monitoring and control system of claim 1 further comprising:

switch output process interface means positioned within said housing and including:

terminal means connectable with a source of power and connectable by field wiring to said load;

a solid-state switch having a switching input connectable with said load and a switching output connectable with said source, said switch being actuable to conduct between said switching input and switching output in response to the assertion of a select bias signal;

first isolation means responsive to a command input signal for effecting the assertion of said select bias signal through dielectrically isolated signal transmission components to actuate said solid-state switch;

current detect network means connectable with said load and said source and having a load current output signal in the presence of a select value of detected load current;

second isolation means responsive to said load current output signal for providing, through dielectrically isolated transmission components, a load current status output;

switch output process control means for controlling said switch output process interface means by assertion of said command input signal and responsive to said load current status output to effect an evaluation with respect to said command input signal and provide switch output process status signals; and said controller means communication processor means is in interactive data transfer communication with said switch output process control means.

9. The monitoring control system of claim 1 in which said controller means includes serial output processor means for interactive communication by serial data transmission along optical channels with a remote supervisory station.

10. An improved monitoring and control system for use with an industrial system wherein a process is carried out within a production environmental zone with energizable loads coupled by a multiplicity of field wires to a control station, comprising:

an environmentally secure housing positionable within said zone;

switch output process interface means positioned within said housing and including:

terminal means connectable with a source of power and connectable by field wiring to said load;

a solid-state switch having a switching input connectable with said load and a switching output connectable with said source, said switch being actuable to conduct between said switching input and switching output in response to the assertion of a select bias signal;

first isolation means responsive to a command input signal for effecting the assertion of said select bias signal through dielectrically isolated signal transmission components to actuate said solid-state switch;

current detect network means connectable with said load and said source and having a load current output signal in the presence of a select value of detected load current;

second isolation means responsive to said load current output signal for providing, through dielectrically isolated transmission components, a load current status output;

switch output process control means for controlling said switch output process interface means by assertion of said command input signal and responsive to evaluate said load current status output with respect to said command input signal and provide switch output process status signals; and controller means positioned within said housing and including communications processor means in interactive data transfer communication with said switch output process control means; first controller memory means, controller central processing means for evaluating said switch output process status signals received by said communications processor means and deriving corresponding process data output signals and for selectively controlling said switch output process control means.

11. The monitoring and control system of claim 10 in which said current detect network means comprises means for deriving a voltage drop in the presence of a predetermined level of current flow between said load and said source and voltage responsive means for deriving said load current output signal in response to said voltage drop.

12. The monitoring and control system of claim 10 including:

source status network means including current output means connectable with said source for deriving a predetermined source state current level in the presence of a select voltage level of said source, and third isolation means responsive to said source state current level for providing, through dielectrically spaced and isolated transmission components, a source status output; and said switch output process control means is responsive to evaluate said source status output and said load current status output with respect to said command input signals and provide corresponding said switch output process status signals.

13. The monitoring and control system of claim 10 in which:

said solid-state switch exhibits a saturated condition when conducting under predetermined normal load conditions and a voltage drop condition under overload effects; and including voltage monitoring network means connectable with said source of power and said switching input and responsive to said solid-state switch saturated and voltage drop conditions to exhibit corresponding switch monitoring conditions, and fourth isolation means responsive to said switch monitoring conditions for providing, through dielectrically isolated transmission components, an overload status output; and said switch output process control means is responsive to evaluate said overload status output and said load curent status output with respect to said command input signals and provide corresponding said switch output process status signals.

14. The monitoring and control system of claim 13 in which:

said voltage monitoring network means comprises current limiting diode means coupled with said source, and a selective bias network exhibiting select impedance coupled between said current limiting diode means, said switching input and said source; and said fourth isolation means includes a photo emissive diode coupled in current transfer relationship between said current limiting diode means and said selective bias network and a dielectrically isolated photoresponsive component for deriving an output responsive to the emissions of said photo-emissive diode for deriving said overload status output.

15. The monitoring and control system of claim 13 including:

source status network means including current output means connectable with said source for deriving a predetermined source state current level in the presence of a select voltage level of said source, and third isolation means responsive to said source state current level for providing, through dielectrically isolated transmission components, a source status output; and said switch output process control means is responsive to evaluate said source status output, said overload status output and said load current status output with respect to said command input signals and provide corresponding said switch output process status signals.

16. The monitoring and control system of claim 15 in which said switch output process control means includes memory means for retaining a compilation of status words corresponding with select combinations of said source status outputs, said overload status outputs and said load current status outputs, and is responsive to received said status outputs to access said memory means to provide a corresponding said status word as said switch output process signal.

17. The monitoring and control system of claim 10 in which said controller means includes serial output processor means for interactive communication by serial data transmission along optical channels with a remote supervisory station.

18. An improved monitoring and control system for use with an industrial system wherein a process is carried out within a production environmental zone with the utilization of actuators with energizable loads coupled by a multiplicity of field wires to a control station, comprising:

an environmentally secure housing positionable within said zone;

terminal means connectable by said field wires with a said load;

first output drive interface means positioned with said housing and including:

first control input means responsive to a control signal input for deriving a corresponding analog signal of predetermined value, first error stage means responsive to said analog signal and to a feedback signal to provide a control output corresponding with the difference of value and polarity thereof;

first current output means responsive to said control output for applying corresponding current from said terminal means to said load, first ground stage means having an input coupled with said terminal means for receiving feedback current through a said field wire from said load and deriving said feedback signal as a voltage value in inverted correspondence with said feedback current, and impedance means coupled with said first ground stage means input for deriving a voltage corresponding with said feedback current, second output drive interface means positioned within said housing and including:

second control input means responsive to a control signal for deriving a corresponding analog signal of predetermined value, second error stage means responsive to said analog signal and to a feedback signal to provide a control output corresponding with the difference of value and polarity between said feedback signal and said analog signal, second current output means responsive to said control output for applying corresponding current from said terminal means to said load, second ground stage means having an input coupled with said terminal means for receiving feedback current through a said field wire from said load and deriving said feedback signal as a voltage value in inverted correspondence with said feedback current, and switch means coupled within said second ground stage input and actuable for effecting said feedback current receipt;

means for connecting said first ground stage input with said second ground stage input;

output drive process control means for controlling said first and second output drive interface means and for selectively actuating said switch means; and controller means positioned within said housing and including communications processor means in interactive data transfer communication with said output drive process control means, controller memory means, controller central processing means for evaluating said status signals received by said communications processor means and deriving corresponding process data output signals and for selectively controlling said output drive process control means.

19. The monitoring and control system of claim 18 in which said first output drive interface means further includes override network means for clamping said first current output means to a predetermined constant current output in the absence of said receipt of said feedback current at said ground stage means.

20. The monitoring and control system of claim 18 in which said first ground stage means comprises amplifier stage means having an inverting configuration and effecting the establishment of virtual ground at its said input.

21. The monitoring and control system of claim 18 further comprising:

switch output process interface means positioned within said housing including:

second terminal means connectable with a source of power and connectable by field wiring to said load;

a solid-state switch having a switching input connectable with said load and a switching output connectable with said source, said switch being actuable to conduct between said switching input and switching output in response to the assertion of a select bias signal;

first isolation means responsive to a command input signal for effecting the assertion of said select bias signal through dielectrically isolated signal transmission components to actuate said solid-state switch;

current detect network means connectable with said load and said source and having a load current output signal in the presence of a select value of detected load current;

second isolation means responsive to said load current output signal for providing, through dielectrically isolated transmission components, a load current status output; and switch output process control means for controlling said switch output process interface means by assertion of said command input signal and responsive to said load current status output to effect its evaluation with respect to said command input signal and provide switch output process status signal; and said controller means communications processor means is in interactive data transfer communication with said switch output process control means.

22. An analog output circuit for connection with actuator derived loads, comprising:

output drive circuit means, including:

control input means responsive to a control signal input for deriving a corresponding analog signal of predetermined value;

error stage means responsive to said analog signal and to a feedback signal to provide a control output corresponding with the difference of value and polarity between said analog signal and said feedback signal;

current output means responsive to said control output for outputting current corresponding therewith at an output thereof to said load;

ground stage amplifier means configured to provide a virtual ground and having an input for receiving feedback current from said load and deriving said feedback signal as a voltage value in inverted correspondence with said feedback current;

output impedance means responsive to said current output means output for deriving a voltage out signal corresponding with said outputted current;

return impedance means responsive to said feedback current from said load for deriving a return signal as a voltage level corresponding with the value of said feedback current; and comparison circuit means responsive to said voltage out signal and said return signal for deriving an effective voltage signal representing their difference and responsive to said control input means analog signal and said effective voltage signal for effecting a comparison of their values to derive a load status signal.

23. The analog output circuit of claim 22 in which said comparison circuit means is responsive to said analog signal and said ground stage amplifier means feedback signal for deriving a loop signal representing their difference and including dual threshold comparator means responsive to dual threshold reference inputs and said loop signal to derive a full loop status signal; and said comparison circuit means including first reference means for deriving said dual threshold reference inputs corresponding with a predetermined tolerance.

24. The analog output circuit of claim 23 in which:

said control output means comprises first and second analog-to-digital converters having respective inputs for jointly receiving a digital input representing a select drive to said load and having respective first and second said analog signals of opposed polarities at the outputs thereof;

said comparison circuit means includes means for summing said first and second analog signals to derive a converter check signal and is responsive to compare said converter check signal with said dual threshold reference inputs to derive a converter status signal.

25. The analog output circuit of claim 22 in which said comparison means includes second reference means for deriving a zero reference signal corresponding with a predetermined minimum current outputted by said current output means to represent a zero active current to said load, and said comparison means is responsive to compare said zero reference signal with said feedback signal to derive an input current status signal.

26. A switch output circuit for connection with loads, comprising:

switch output means including:
terminal means connectable with a source of power and connectable by field wiring to said load;
a solid-state switch having a switching input connectable with said load and a switching output connectable with said source, said switch being actuable to conduct between said switching input and switching output in response to the assertion of a select bias signal;
first isolation means responsive to a command input signal for effecting the assertion of said select bias signal through dielectrically isolated signal transmission components to actuate said solid state switch;
current detect network means connectable with said load and said source and having a load current output signal in the presence of a select value of detected load current;
second isolation means responsive to said load current output signal for providing a current status output; and
switch output process control means for controlling said switch output process interface means by assertion of said command input signal and responsive to said load current status output to effect an evaluation of said load current status output with respect to said command input signal.

27. The switch output circuit of claim 26 in which said current detect network means comprises means for deriving a voltage drop in the presence of a predetermined level of current flow between said load and said source, and voltage responsive means for deriving said load current output signal in response to said voltage drop.

28. The switch output circuit of claim 27 including:
source status network means including current output means connectable with said source for deriving a predetermined source state current level in the presence of a select voltage level of said source, and third isolation means responsive to said source state current level for providing, through dielectrically spaced and isolated transmission components, a source status output; and
said switch output process control means is responsive to evaluate said source status output and said load current status output to with respect to said command input signals and provide corresponding said swith output process status signals.

29. The switch output circuit of claim 26 in which:

said solid-state switch exhibits a saturated condition when conducting under predetermined normal load conditions and a voltage drop condition under overload effects; and
including voltage monitoring network means connectable with said source of power and said switching input and responsive to said solid-state switch saturated and voltage drop conditions to exhibit corresponding switch monitoring conditions, and fourth isolation means responsive to said switch monitoring conditions for providing, through dielectrically isolated transmission components, and overload status output; and
said switch output process control means is responsive to evaluate said overload status output and said load current status output with respect to said command input signals and provide corresponding said switch output process status signals.

30. The switch output circuit of claim 29 in which:
said voltage monitoring network means comprises current limiting diode means coupled with said source and a selective bias network exhibiting select impedance coupled between said current limiting diode means, said switching input and said source; and
said fourth isolation means includes a photo emissive diode coupled in current transfer relationship between said current limiting diode means and said selective bias network and a dielectrically isolated photoresponsive component for deriving an output responsive to the emissions of said photo-emissive diode for deriving said overload status output.

31. The switch output circuit of claim 29 including:
source status network means including current output means connectable with said source for deriving a predetermined source state current level in the presence of a select voltage level of said source, and third isolation means responsive to said source state current level for providing, through dielectrically isolated transmission components, a source status output; and
said switch output process control means is responsive to evaluate said source status output, said overload status output and said load current status output with respect to said command input signals and provide corresponding said switch output process status signals.

32. The switch output circuit of claim 31 in which said switch output process control means includes memory means for retaining a compilation of status words corresponding with select combinations of said source status outputs, said overload status outputs and said load current status outputs, and is responsive to received said status outputs to access said memory means to provide a corresponding said status word as said switch output process signal.

33. A system for monitoring the status of field contacts and the field wires which are operationally associated therewith, comprising:
contact monitoring means including:
terminal means connectable with first and second said field wires extending to said field contacts;
means for applying a predetermined potential of first polarity to said first field wire and a predetermined potential of second polarity to said second field wire;
bias response means coupled with said two field wires and said contacts in the vicinity of said contacts and deriving a first analog voltage signal corresponding with said first field wire and a second analog voltage signal corresponding with said second field wire;

comparator means responsive to said first and second analog signals and to predetermined threshold signals for deriving contact input status signals;

threshold means actuable for generating said predetermined threshold signals; and contact input process control means for selectively actuating said threshold means and receiving said contact input status signals.

34. The system of claim 33 in which said bias response means includes an impedance network providing a first select impedance in parallel electrical connection with said field contacts and a second select impedance in series therewith and said first field wire.

35. The system of claim 34 in which:

said threshold means comprises a digital-to-analog converter actuable to derive a said threshold signal as an analog voltage in response to an applied predetermined digital signal input; and said contact input process control means selectively applies said predetermined digital signal input.

36. The system of claim 34 in which said contact input process control means selectively actuates said threshold means to derive a fault categorized one of said input status signals from said comparator means representing the presence of any detectable fault condition of said field contacts and first and second field wires and subsequently actuates said threshold means in the presence of a said fault categorized input status signal to provide a predetermined sequence of said threshold signals to derive an evaluation characterized said contact input status signal from said comparator means.

37. The system of claim 34 in which:

said bias response means includes an impedance network providing a first select impedance in parallel electrical connection with said select switching monitor and a second select impedance in series with said select switching monitor and said first field wire;

said threshold means comprises a digital-to-analog converter deriving a said threshold signal as an analog voltage in response to actuation by an applied predetermined digital signal input; and said contact input process control means selectively applies said predetermined digital signal input.

38. The system of claim 37 in which said contact input process control means actuates said threshold means by application of a predetermined sequence of said digital signal inputs to said digital-to-analog converter, each such signal input representing a predetermined state of said field contacts and associated said two field wires.

* * * * *